Sept. 20, 1966  F. W. McLARTY  3,273,653
ROTARY WING AIRCRAFT
Filed Oct. 4, 1957  14 Sheets-Sheet 7
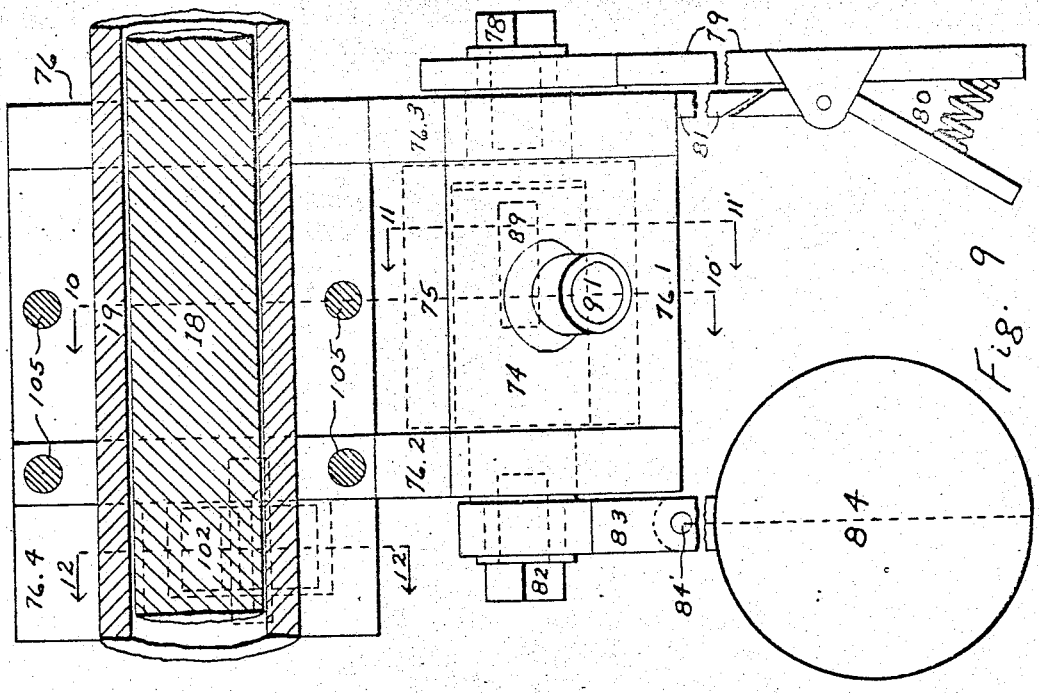
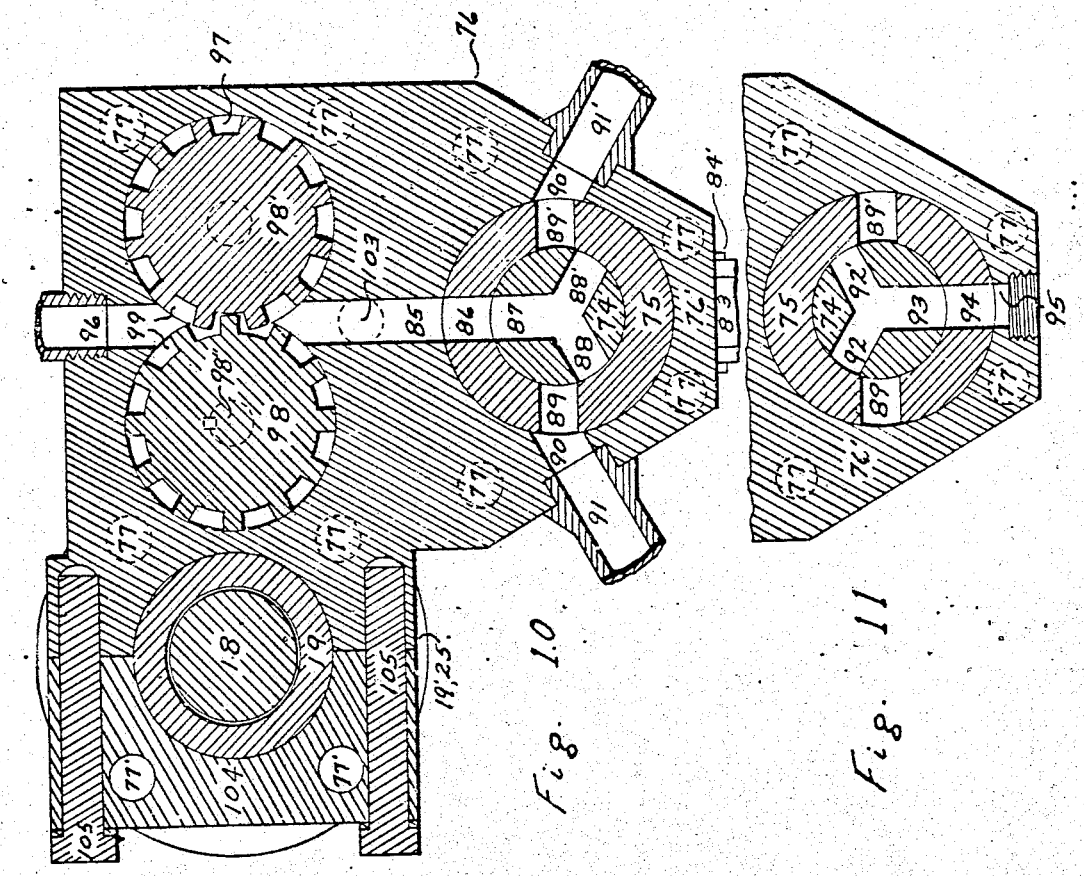

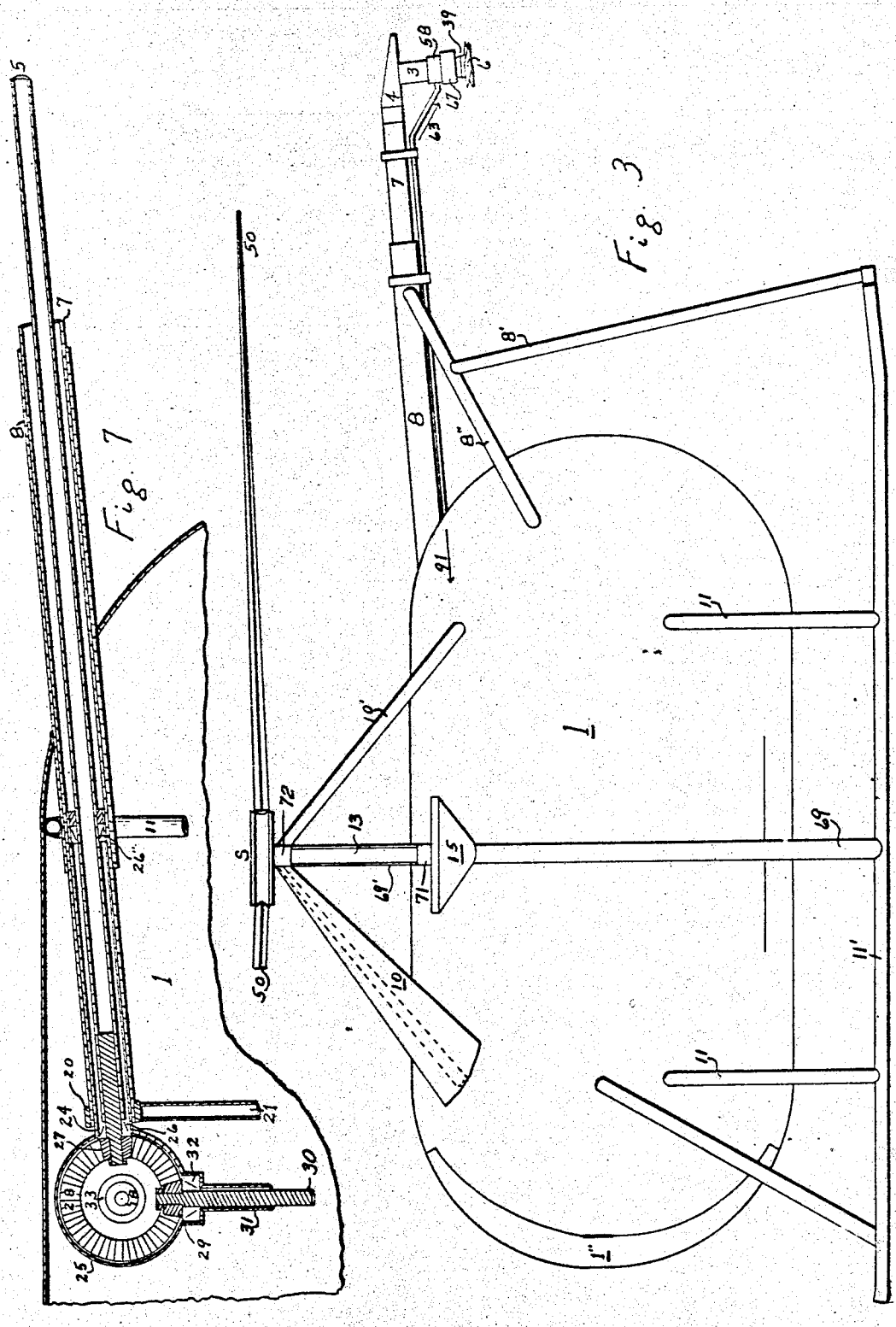

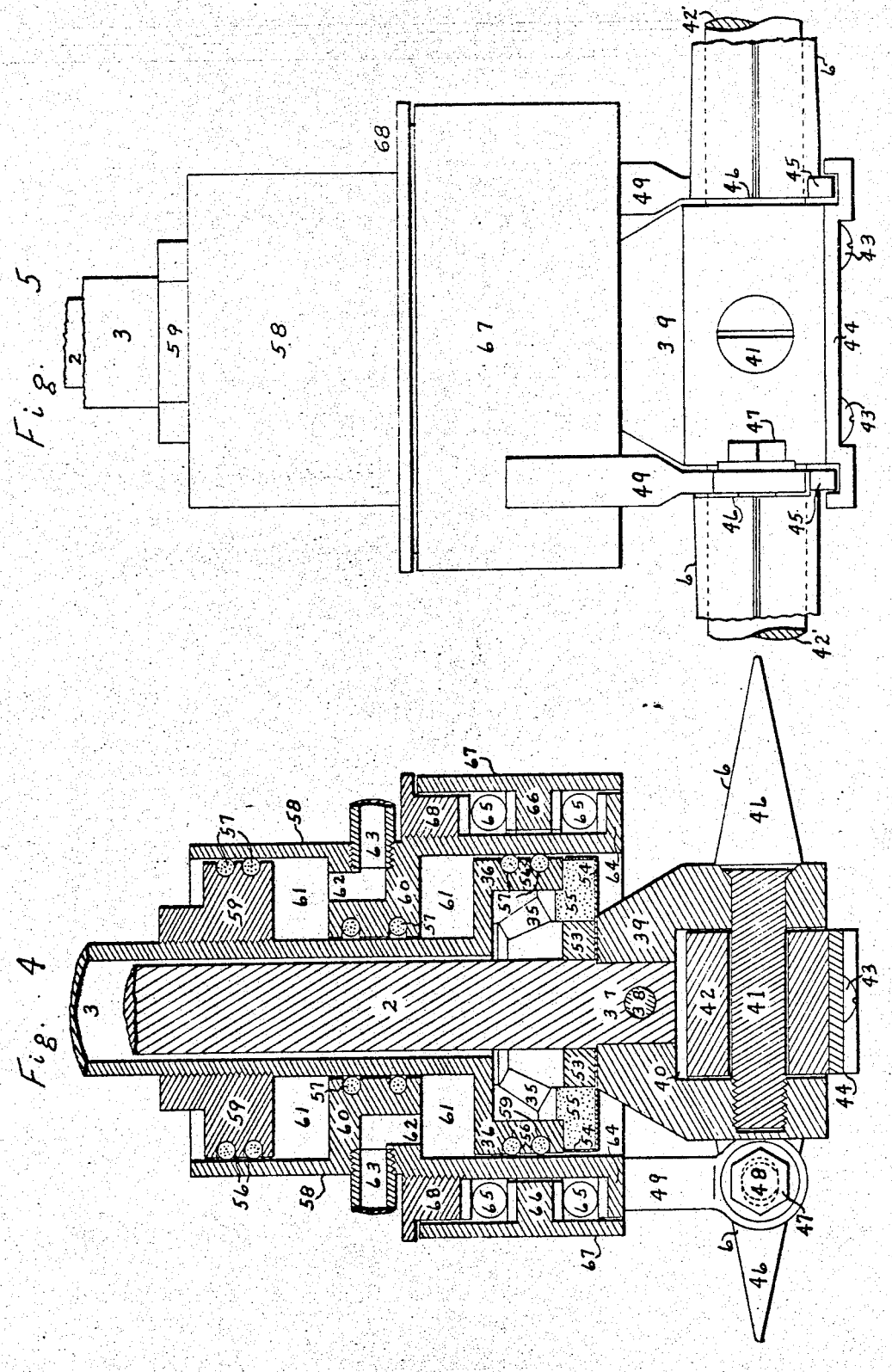

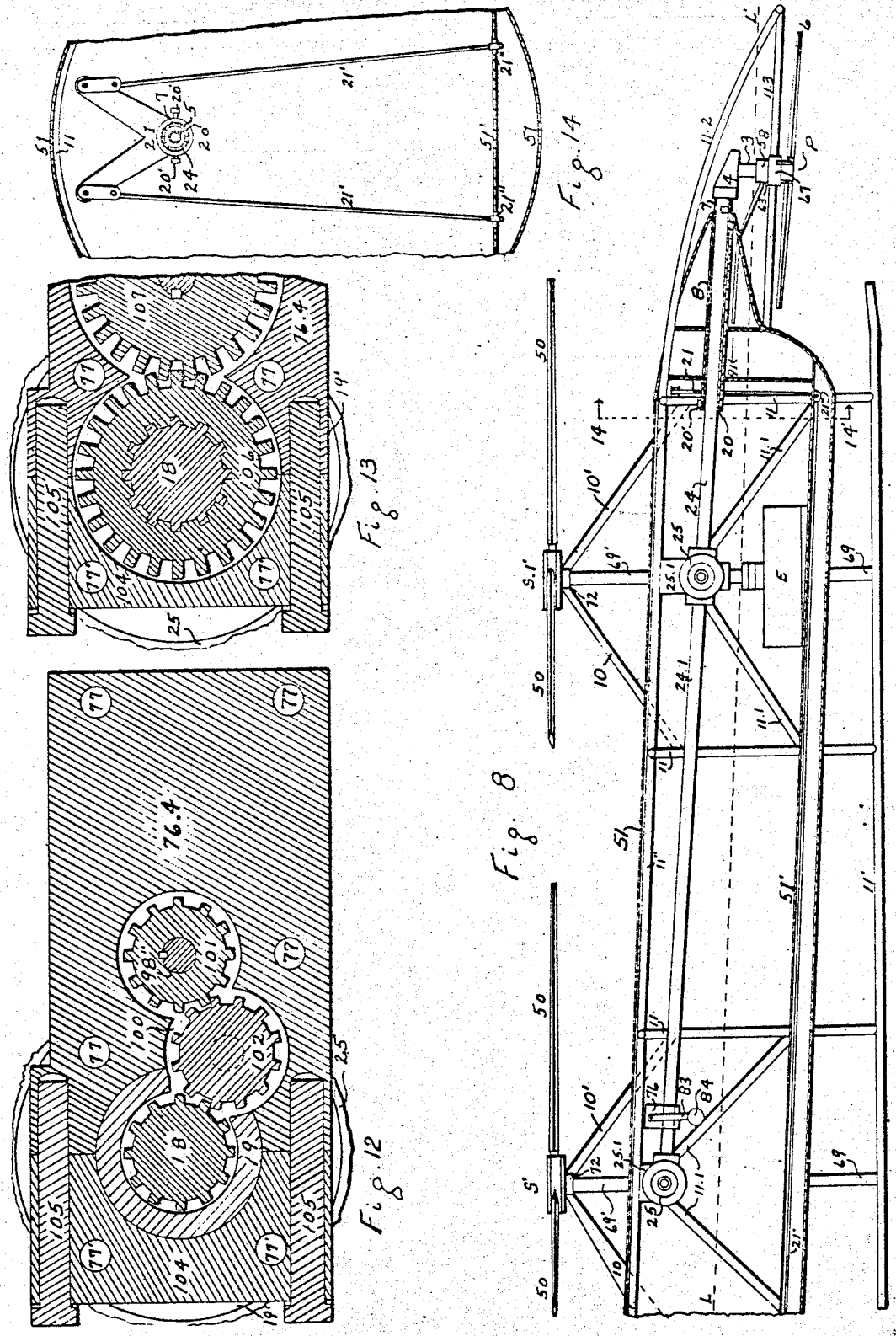

Sept. 20, 1966 F. W. McLARTY 3,273,653
ROTARY WING AIRCRAFT
Filed Oct. 4, 1957 14 Sheets-Sheet 8

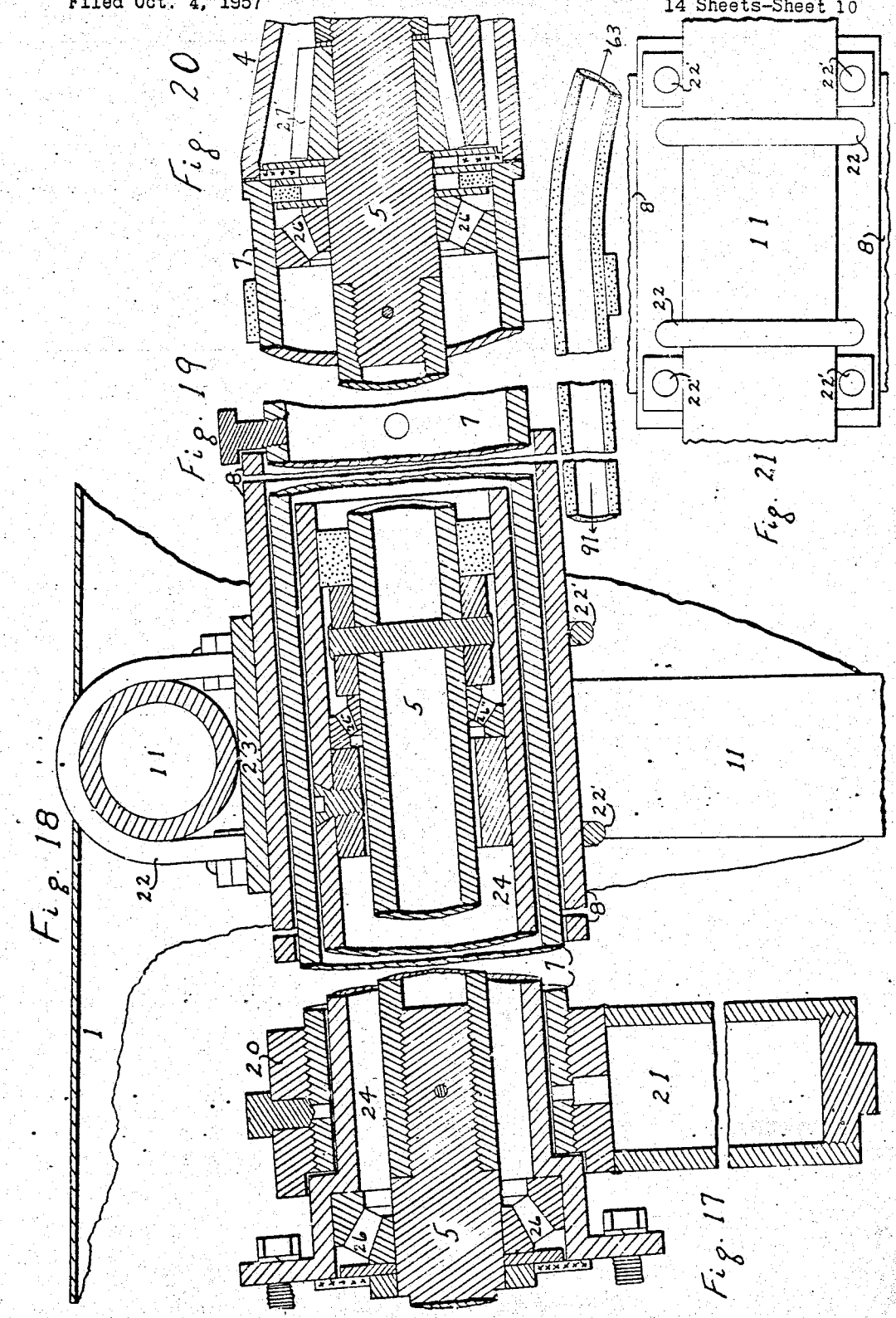

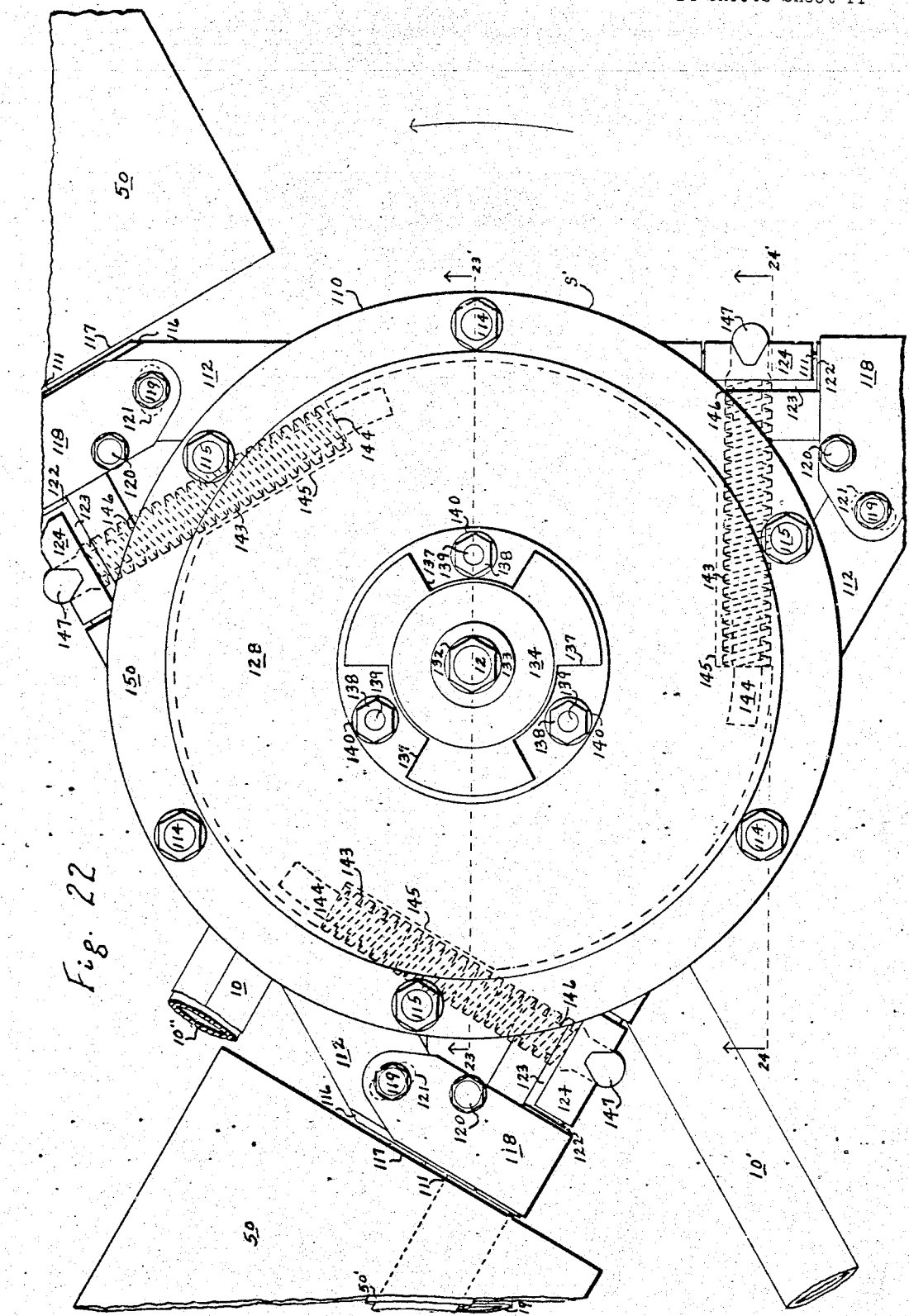

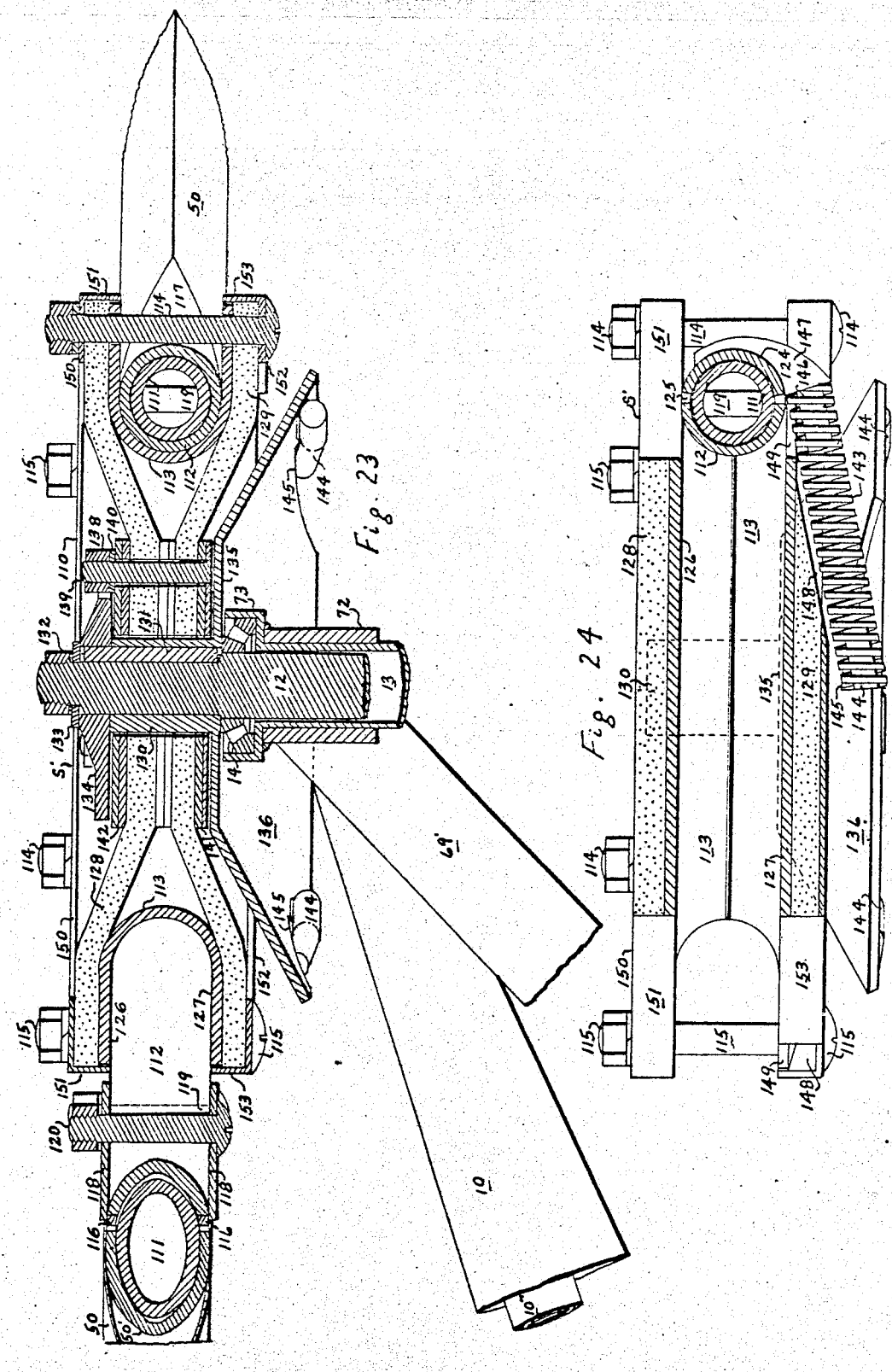

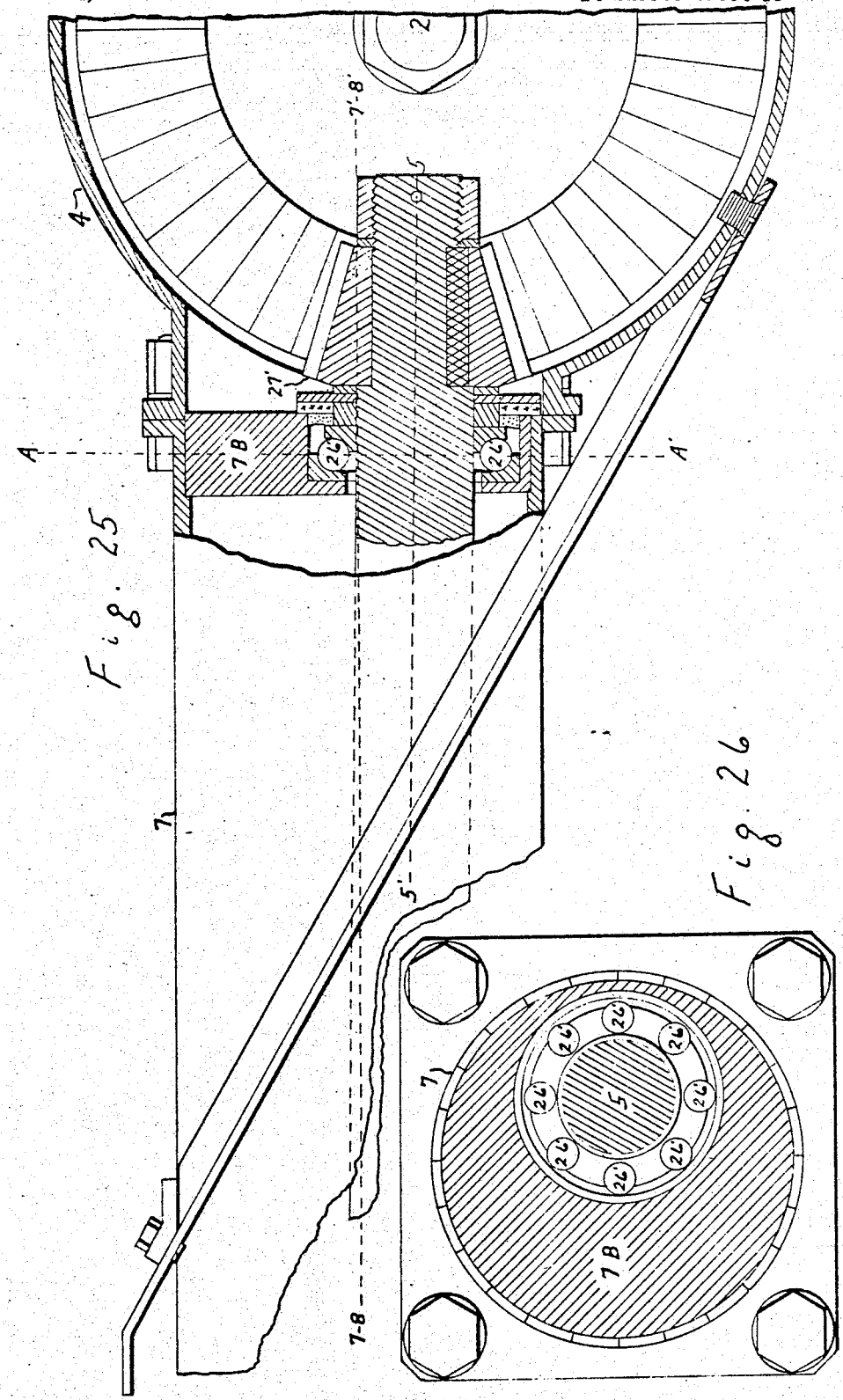

Sept. 20, 1966 F. W. McLARTY 3,273,653
ROTARY WING AIRCRAFT
Filed Oct. 4, 1957 14 Sheets-Sheet 14

United States Patent Office 3,273,653
Patented Sept. 20, 1966

3,273,653
ROTARY WING AIRCRAFT
Frank W. McLarty, 337 S. Edgefield Ave.,
Dallas, Tex. 75208
Filed Oct. 4, 1957, Ser. No. 688,318
3 Claims. (Cl. 170—135.2)

This invention relates to new and useful improvements in the art of rotary wing aircraft, and it particularly relates to means of *pivotally mounting* sustaining rotors at considerable distances from a power source located in a fuselage or suitable frame for mounting a prime mover.

The primary purpose of such mounting is that a rotor so mounted not only may serve as a means of overcoming gravity but, automatically or at the election of the operator, may have its axis of rotation shifted to tilt the rotor for effecting horizontal movement of the craft or may rotate the craft relative to the points of the compass for steering purposes.

A second object is to provide a hydraulic pressure control system that will cause changes in the angle of attack of blades of such a pivotally mounted rotor to accomplish the foregoing purposes, either individually or simultaneously.

A third object is to provide an automatic means in conjunction with the hydraulic pressure control system (apart from control by the center of gravity of the fuselage or engine frame and cargo) for maintaining the equilibrium of the craft, as that equilibrium may be determined by the operator for his particular desire as to forward, rearward, or vertical movement.

A fourth object is to provide a simple means of mounting sustaining rotors in pairs at equal distances from the sides of a fuselage (or framework for mounting the engine of the craft) with means for keeping the shafts of the paired rotors substantially parallel in the same plane, the paired rotors thus serving as gyroscopes to keep the craft level from side to side but yielding readily to longitudinal tilting of the craft for control purposes, because precession of one rapidly turning rotor cancels that of a similar rotor turning in the opposite direction at the same speed.

A fifth object is to provide streamlined bracing means between the fuselage and the paired rotor mountings such that some lift will be imparted thereby on forward movement of the craft at relatively high speeds.

A sixth object is to provide means of employing a shaft otherwise used to rotate a main sustaining rotor, regardless of the number of sustaining rotors, to drive a hydraulic pump whereby fluid is supplied under pressure to a control system for varying the angles of attack of the blades of a longitudinal fuselage-tilt and direction-control (around the vertical axis of the craft and relative to the compass) rotor and/or varying the tilt of the axis of rotation of such a pivotally mounted rotor, thereby causing continual effectiveness of the said control rotor for steering and otherwise controlling the shaft, whether the sustaining rotors are turning by autorotation or otherwise, since the auxiliary control rotor and the main sustaining rotors are interconnected by suitable gears and shafts.

A construction fashioned to carry out the invention will be described, from which description other special objects will be apparent.

The invention will be understood most readily from a reading of the following specification in conjunction with the accompanying drawings, wherein an example of the invention is shown, and wherein:

FIG. 1 is a top plan view of a rotary wing aircraft sustained primarily by two *automatically self-controlling* three-bladed side-by-side rotors (as to auto-rotation and otherwise as to angle of blade pitch under engine power by variation of torque on the paired rotor shafts, as to cyclical variation of blade pitch on advancing and retreating sides of the rotor orbits in translational flight to compensate differences of lift, as to gradual limitation of universal oscillation of resiliently flexible hubs about their respective mounting shafts, and as to gradually limited axial movement of said rotor hubs relative to said shafts whereby stresses in the blades are minimized in rough air and whereby said rotor hubs, in which the blade roots have cantilever mountings oscillate pivotally within fixed limits on axes at least almost in alignment with the longitudinal axes of the blades, are substantially stabilized relative to their shafts by coming down to rest on circular transverse projections extending outward around each shaft, to which the said projecting plates are rigidly attached below each resiliently flexible hub, when the craft lands, the resiliently flexible hubs, however, having sufficient stiffness between their inner and outer elements to transfer substantially all the gyroscopic stabilizing forces of the main sustaining rotors to their respective shafts on which they are mounted rigidly and having a third auxiliary control rotor with two variable and reversible pitch blades, the auxiliary rotor being mounted at the rear of the fuselage in my novel pivotal mounting arrangement that permits use of only the *one* auxiliary rotor, through change of its axis of rotation, to determine whether the craft goes to the right or left and to determine longitudinal tilt relative to the horizon of the fuselage (and thereby of the two main sustaining rotors through their stiff resiliently flexible hubs) for moving forward or rearward or for vertical flight or hovering, dependent on the engine throttle.

FIG. 3 is a left side longitudinal elevation of the craft shown in FIG. 1 and shows position of the auxiliary control rotor relative to the other two side-by-side main sustaining rotors and to the fuselage to which its pivotally mounted shaft housing assembly frame is attached in a bracket protruding rearward therefrom.

FIG. 4 is a detail vertical cross section through the axis of the lower fragment of the rotatable shaft and its completely telescoping tubular housing of the auxiliary control rotor designated P in FIG. 1.

FIG. 5 is a detail rear view of the auxiliary control rotor shown in FIG. 4 at right angles thereto and shows fragmentarily the portions adjacent the hub of the two airfoil blades of the control rotor generally designated P in FIGS. 1, 2 and 3.

FIG. 7 is a fragmetary longitudinal vertical cross section at the center of the upper rear portion of the fuselage shown in FIG. 3 but at twice the scale thereof and shows bevel gears driving all such rotors in conjunction from a power source beneath the bevel gears.

FIG. 8 is a fragmentary longitudinal vertical cross section through the center of the rear portion of the fuselage shown in FIG. 2 and shows the tubular housings inclosing the drive shafts of the rotors thereof.

FIG. 9 is a detail vertical cross section through the axis of one of the horizontal shafts shown in FIG. 6 and shows a means of mounting the hydraulic pump and control valve on the housing of the shaft which drives the pump continuously in flight.

FIG. 10 is a detail vertical cross section through the shaft, housing, hydraulic pump and control valve of FIG. 9 perpendicular to each at line 10–10' thereof.

FIG. 11 is a detail vertical cross section through the same control valve in another perpendicular plane at line 11–11' of FIG. 9.

FIG. 12 is a detail vertical cross section at line 12–12' of FIG. 9 perpendicular to the shaft and to the axes of a pair of pump gears driven thereby.

FIG. 13 is a detail vertical cross section of an alternative intermeshing gear arrangement driving the hydraulic pump at the same vertical plane as FIG. 12.

FIG. 14 is a detail lateral vertical cross section through the fuselage shown in FIG. 8 at the perpendicular plane indicated by line 14–14' therein.

FIG. 17 is a detail vertical longitudinal cross section through the axis of the same somewhat horizontal drive shaft of the control rotor, showing a cross section of the tubular bracket in which the tubular housing of the shaft is mounted pivotally and by which that tubular housing is suspended from a fixed framework within the fuselage, and also showing a tapered roller bearing within a tubular housing, rigidly attached to the ring-gear box, within the pivotally mounted shaft housing within which the somewhat horizontal shaft rotates to turn the control rotor by means of bevel gears.

FIGURE 18 is another cross section view of part of the horizontal drive shaft of the control rotor.

FIG. 19 is a small detail cross section of the pivotally mounted tubular shaft housing at the rear of the tubular bracket showing multiple stud bolts screwed into the tubular housing as a means of maintaining the longitudinal position of that tubular housing relative to the bracket in which it is mounted to oscillate pivotally.

FIG. 20 is a detail vertical longitudinal cross section through the axis of the drive shaft shown in FIGS. 17, 18, and 19 showing the rear bearing in which rotates that shaft mounting a bevel gear (in the gear box shown in FIG. 3) by which it rotates a gear driving the shaft of the auxiliary tilt and steering control rotor at the rear of the fuselage.

FIG. 21 is a plan view from above of the means of attachment of the tubular bracket, shown fragmentarily in FIG. 18, to one of the inverted U-shaped tubular frames of the fuselage, also shown fragmentarily in FIG. 7.

FIGS. 22, 23, and 24 pertain to a pair of side-by-side rotor hubs.

FIG. 25 is a top plan view of the rear tip of a tubular shaft-housing as shown in FIG. 20, but at right angles thereto, from which the upper half has been cut away to reveal the lower half of an alternative roller ball-bearing arrangement mounting the rear tip of the drive shaft slightly diagonal to the axis of the pivotal mounting of the tubular shaft-housing in the tubular bracket shown in FIGS. 18 and 19.

FIG. 26 is a detail vertical lateral cross section through the drive-shaft, bearing, and tubular shaft-housing shown in FIG. 25 along line A–A'.

Figure 27:
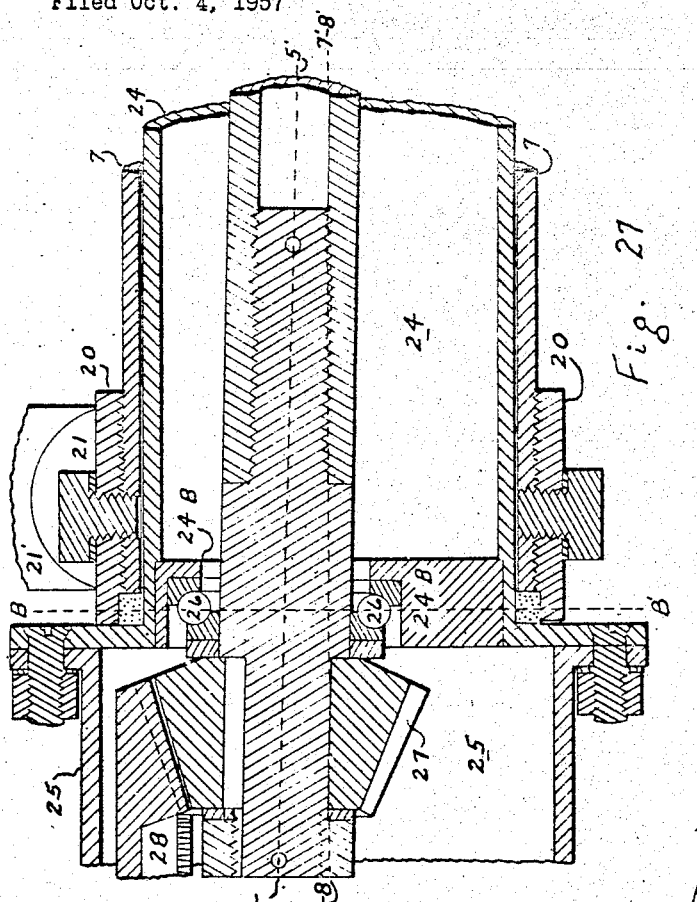

FIG. 27 is a cross section through the axis of the drive-shaft in the same plane as the cut-away section of FIG. 25 and revealing a corresponding alternative ball anti-friction roller bearing mounting the front tip of the drive-shaft diagonally to the axis in its bracket of a pivotally oscillatable tubular shaft housing as indicated at right angles thereto in FIGS. 17, 18, 19, and 20.

Figure 15:
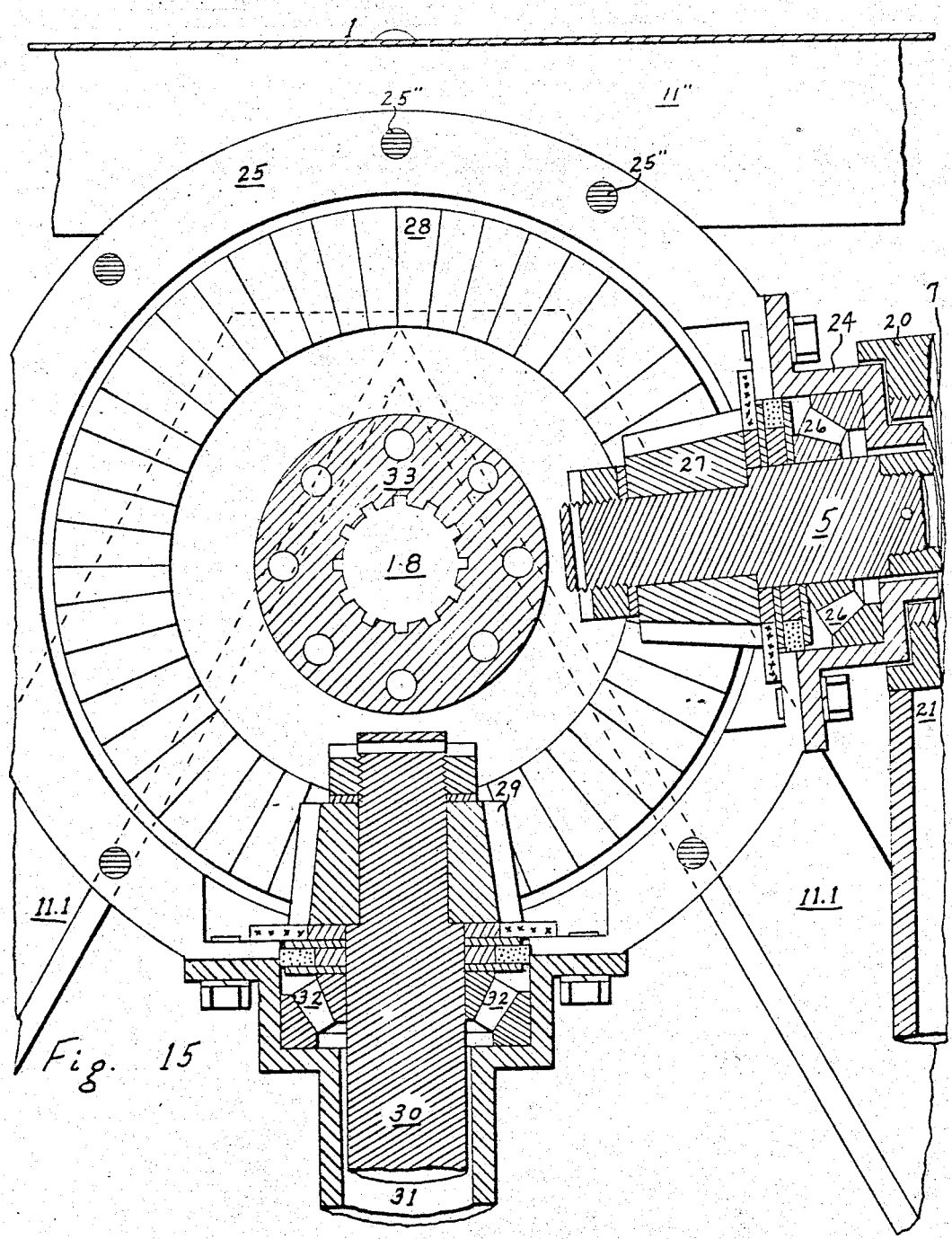
FIG. 15 is a detail vertical cross section through the axes of drive shafts shown in FIG. 7 showing in larger scale the transmission ring-gear housing box, ring-gear and rotatable retainer thereof telescoping a splined shaft therein, and means of attaching the gear housing box rigidly to the roof and walls of the fuselage.
Figure 28:
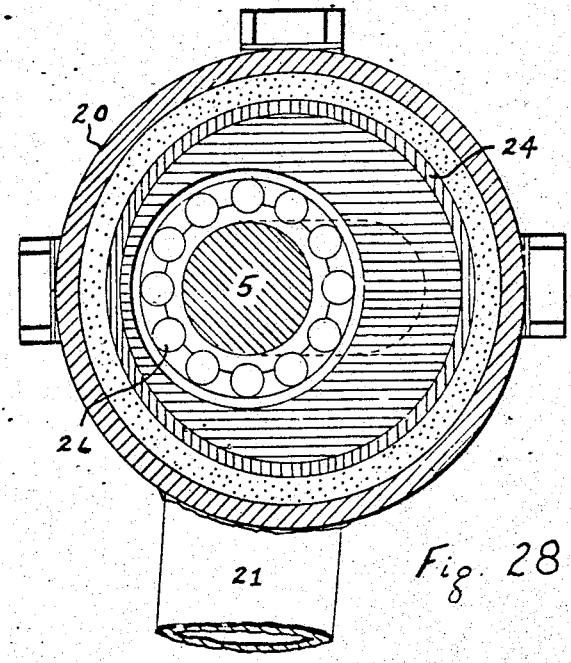

FIG. 28 is a cross section at line B–B' of FIG. 27 at right angles to the axis of the drive shaft and its ball bearing mounted in the front tip of a telescoped tubular shaft housing bolted to the rear side of the ring-gear housing indicated in FIG. 17 as well as in FIGS. 27, 15, and 7.

Figure 29:
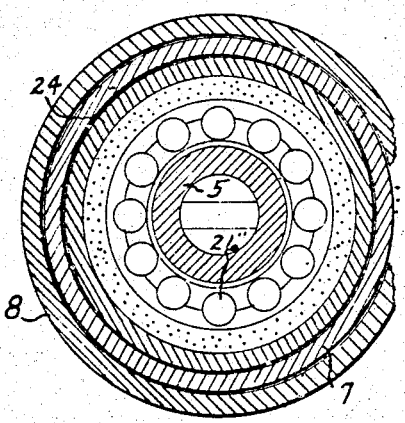

FIG. 29 is a cross section at right angles to the axis of the drive-shaft and a ball anti-friction bearing mounted in the telescoped tubular housing around which the slightly larger tubular housing is pivotally oscillatable inside its tubular bracket as indicated in FIG. 18, the ball bearing of FIG. 29 being used in lieu of the tapered roller bearing indicated in FIG. 18 below the fuselage framework from which the tubular bracket is suspended.

Figure 1:
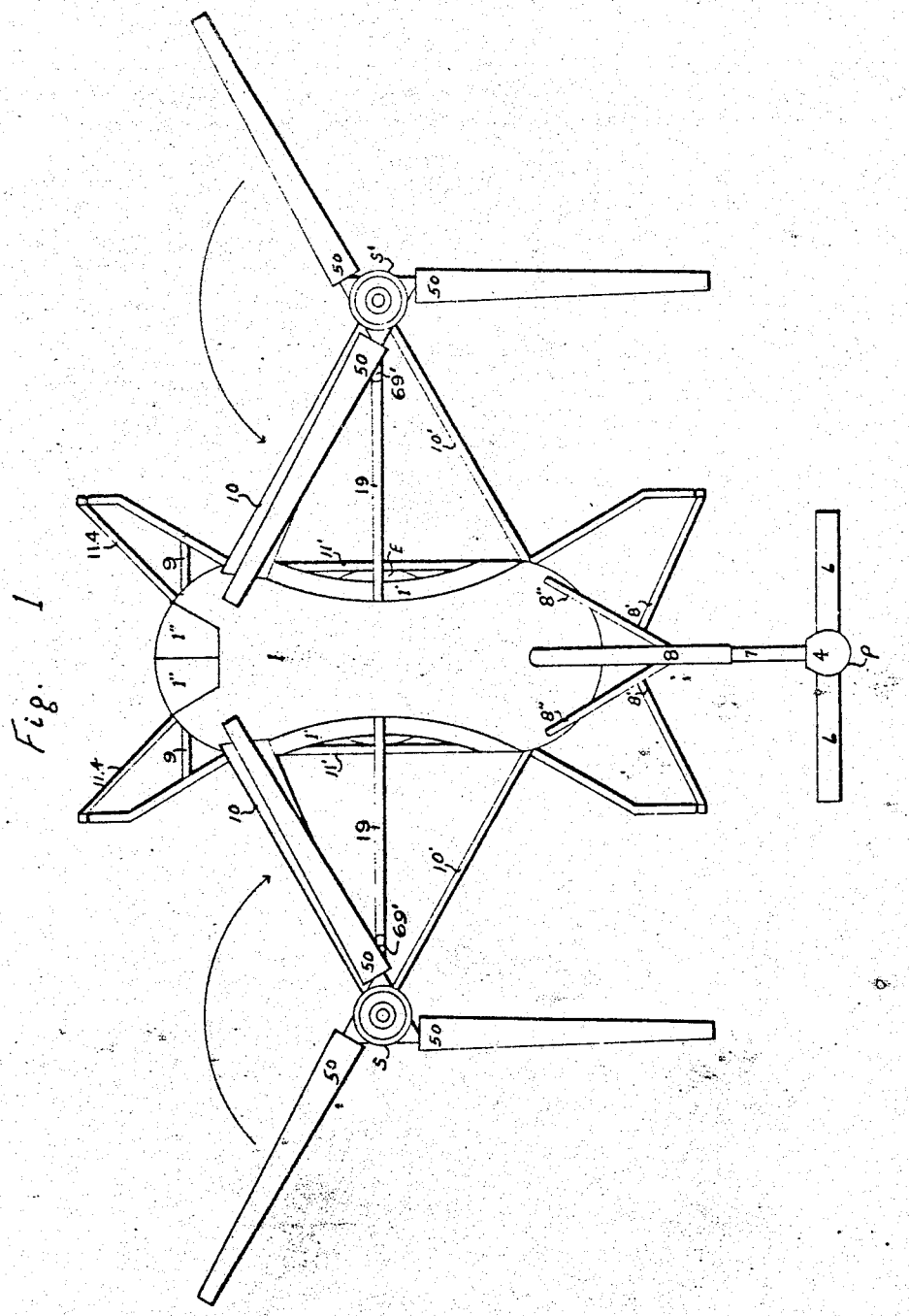
Figure 2:
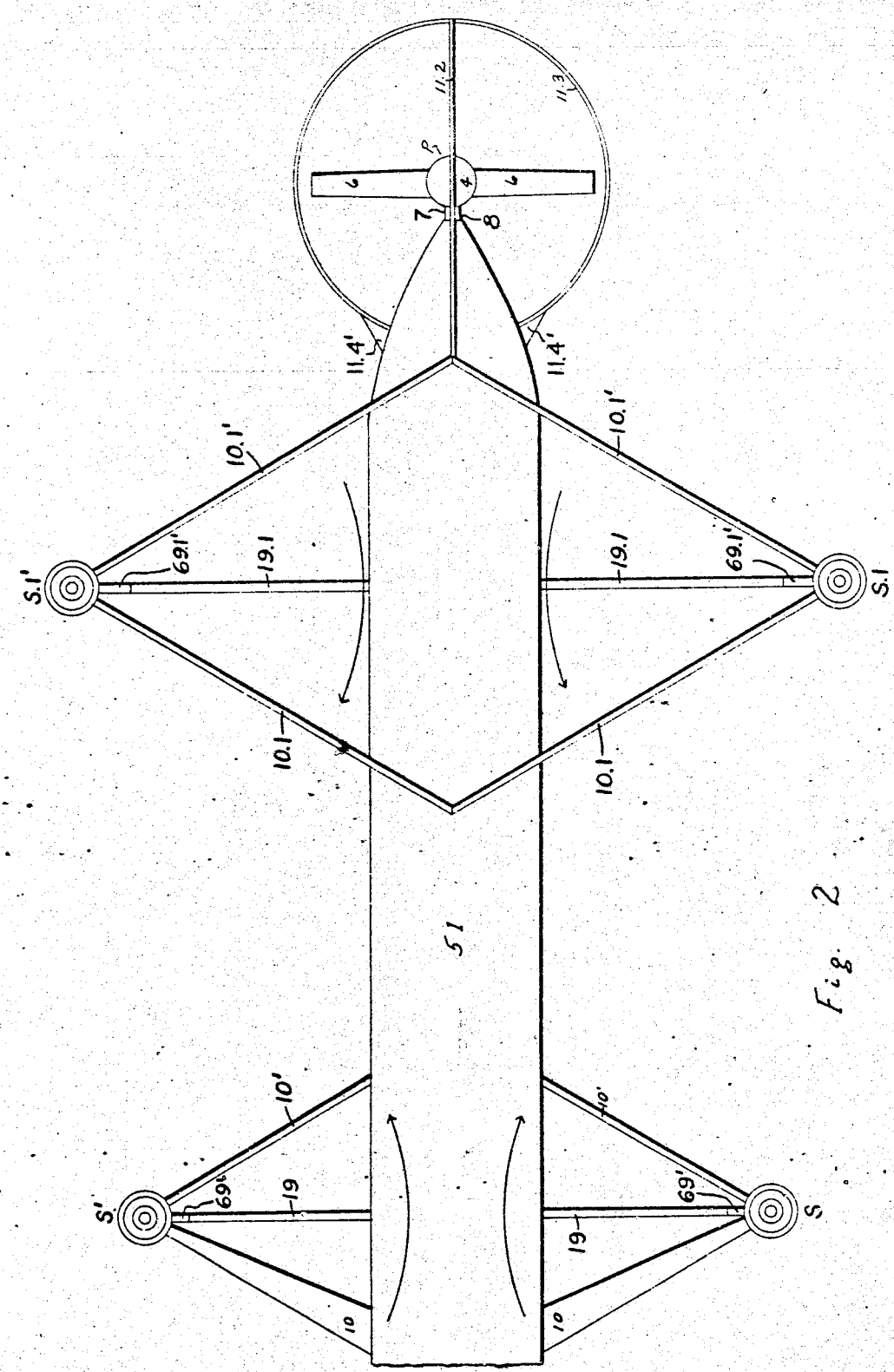
FIG. 2 is a top plan view of a similar rotary wing aircraft having two pairs of such main sustaining rotors mounted side-by-side on a single long fuselage, at the rear end of which is mounted a similar pivotally mounted shaft housing assembly of an auxiliary longitudinal fuselage tilt and direction control rotor.

A top plan view of a single control rotor pivotally mounted in the manner of the present invention is indicated generally by the letter P in FIG. 1 and in FIG. 2, and a side view of the control rotor P of FIG. 1 is shown in FIG. 3. Such pivotal mountings may be made on both sides or both ends of a craft; but pivotally mounted rotor P is indicated in FIG. 1 at the rear end of fuselage 1, where its pivotal oscillation has special significance not only for steering the craft relative to the points of the compass, but for lifting *and* tilting the craft to determine whether the craft (regardless of the number of paired sustaining rotors) will hover or move vertically or go forward or backward. In FIG. 1 are indicated two three-blade self-controlling sustaining rotors mounted at equal distances from the center of the fuselage 1, which is generally cylindrical with rounded ends. These two side-by-side rotors S and S' are specially constructed for operating in pairs, with one of a pair mounted on each side of the fuselage, in conjunction with the pivotally mounted rotor P at the rear; and all of the three rotors are designed for adapting themselves to such cross currents as those to which they may be subjected by virtue of their use with the pivotally mounted steering tilting control rotor P.

In FIG. 3 the rotor P is shown in a normal position perpendicular to a substantially vertical shaft 2 carried in suitable bearings in a tubular housing 3, which will be explained later in connection with FIGS. 4 and 5. Tubular housing 3 is rigidly attached to a gearbox 4, in which are carried a bevel gear mounted on the end of the upright shaft 2 in housing 3 and a meshing bevel gear mounted on the tip of a somewhat horizontal shaft 5 by means of which blades 6 of the rotor P are rotated by the engine E of the craft. A tubular housing 7 having suitable bearings therein carries the somewhat horizontal shaft 5 of the meshing bevel gear and in turn is pivotally mounted inside the tubular bracket 8, which protrudes somewhat longitudinally from the upper rear portion of fuselage 1 and is supported in part by braces 8', 8'' diagonally disposed and attached to each other, to the tubular bracket 8, to the ends of somewhat horizontal and longitudinally disposed landing frame members 11', and to a tubular frame member 11, which rises somewhat vertically from the tubular landing frames 11' beneath the fuselage 1 and forms an inverted "U" within the generally cylindrical section of the fuselage adjacent its hemispherical rear tip. Obviously, the vertical shaft 2, on which the auxiliary control rotor P having blades 6 is mounted (on pivot pin 41 in yoke 39 held by key 38, as will be explained in connection with FIG. 4) might have been turned diametrically upward (along with its telescoping tubular housing 3 rigidly attached to gear box 4 in turn rigidly attached to tubular housing 7 pivotally mounted in longitudinally disposed tubular bracket 8 protruding rearward from fuselage 1) to an altered position corresponding to the rotor shafts 12 shown in cross section in FIG. 6, where the vertical shafts 12 mount the paired sustaining rotor hubs S and S' and are carried in tubular housings 13 (with suitable bearings 14 for rotation therein), which are joined at the lower tips thereof to gear boxes 15, within which are mounted bevel gears 16 and 17 for driving the shafts 12 by rotation of horizontal shafts 18 in the tubular housings 19. But the rotors P in FIGS. 1, 3, and 2 have been shown suspended beneath the gear-box 4, because the weight of the rotor P, thus suspended from tubular drive-shaft housing 7 pivotally oscillatable in bracket 8, tends to bring the axis of shaft 2 mounting steering rotor P into a neutral position to drive the craft straight forward in the absence of any action by the operator to turn the craft to right or left by oscillation of tubular drive-shaft housing 7 in its pivotal mounting in bracket 8. Conversely, if the pilot pivotally oscillates housing 7 in bracket 8 and thereby shifts steering rotor P laterally with respect to a vertical plane containing the axis of that pivotal mounting, the weight of rotor P thereby will be shifted laterally relative to the longitudinal axis of fuselage 1. And any such lateral shifting of the weight of rotor P suspended below tubular housing 7 mounted pivotally in bracket 8, rigidly attached to fuselage 1, will tend to change the center of gravity of the craft, thereby tending to cause conventional slippage of the craft toward the lateral direction in which the weight of steering rotor P at the tail end of the craft is shifted, because the weight of the diagonally displaced rotor shaft, housing, blades, and means of adjusting pitch thereof will tend to exert a torque around the longitudinal axis of the fuselage 1. But, at the same time and by virtue of the swinging of rotor P laterally of the axis of housing 7 in bracket 8, the normal small upward axial thrust of that rotor in powered flight will develop some limited horizontal vector force (resulting from the lateral tilting of housing 3 and its telescoped shaft 2 in conjunction with the pivotal oscillation of tubular housing 7 in bracket 8) pushing the tail of the shaft in the opposite direction from that toward which the weight is shifted and thereby tending to rotate the craft around its vertical axis to direct the nose of the craft in the same lateral direction as the shift of weight and resultant side slippage tendency needing correction. If, however, a passenger shifts his weight from one side of the fuselage to the other and thereby causes a tendency for the craft to slip in that direction, the natural tendency of the pilot will be to oscillate the housing 7 (by means of lever 21 rigidly attached to that tubular housing forward of the bracket 8 and inside the rear wall of the fuselage) to shift the weight and horizontal vector force of the small normally lifting steering rotor P in the opposite direction from that toward which the passenger moves in order to maintain desired direction of the craft relative to the compass. All of these desirable tendency features of the rotor P would be in the opposite disadvantageous directions, if the tail rotor P were disposed upward from the pivotally oscillatable housing 7 and its almost telescoped driveshaft 5.

A means of oscillating the pivoting tubular housing 7 in the cylindrical tubular bracket 8 is indicated in FIG. 7, which is a vertical longitudinal cross section at twice the scale of FIG. 3 through the mid-section of the rear upper portion of the fuselage 1. Depending from a reinforcing ring 20 rigidly attached to the forward tip of the tubular housing 7 is a lever 21 by means of which the operator may tilt the oscillating control rotor P from side to side in the pivotal bracket 8, which may be attached by suitable means (such as U-bolts 22 inserted and secured through holes in a somewhat horizontal plate between the bracket 8 and the crest of the interior fuselage frame member 11) to the interior framework of the fuselage forward of the rear wall thereof.

It is logical (but not absolutely necessary) to mount side-by-side paired seats under the inverted "U" shaped tubular frames 11 in the forward and rear sections of the fuselage, and single seats may be placed in tandem adjacent the center of the fuselage 1.

Rotatably fitted within the forward portion of tubular housing 7 is a smaller tubular housing 24 attached rigidly to a central ring-gear box 25 and extending rearward slightly rearward of the fuselage frame 11 inside the pivotally oscillatable tubular housing 7. Within tubular housing 24 attached to the central ring-gear box 25 by multiple bolts (shown in detail FIG. 17) may be seen diagonal lines which diagrammatically indicate axes of suitable tapered roller bearings 26″, within which rotates in flight the somewhat horizontal shaft 5 that drives the blades 6 of the pivotally mounted rotor P. In FIG. 7 it is indicated that the mid-portion of this drive-shaft 5 may be tubular, but its forward section is cross-hatched as the cross section of a cylindrical shaft on whose end is keyed a bevel gear 27. The bevel gear 27, whose teeth may be helical like those of the drive pinion in the differential assembly of the rear axle of an automobile, meshes with a ring-gear 28, which under ordinary circumstances in flight is driven by a bevel gear 29 (an exact duplicate of bevel gear 27) keyed on the upper tip of a drive-shaft 30 (here shown as vertical, although that disposition may be of changed design) connected by suitable rotational means with the drive-shaft of an engine E or prime-mover of the craft. In FIG. 7 this vertical drive-shaft 30 from the engine is mounted in a tubular housing 31, whose expanded upper tip mounts a suitable anti-friction tapered roller bearing 32 (axes of rollers indicated by diagonal lines) and is attached rigidly to the ring-gear housing box 25, as will be explained later. But the paired side-by-side rotors (having blades 50 mounted on cantilever axes in hub brackets 17) may automatically and instantaneously become aerodynamically autorotational at times (such as in cases of complete power failure or *any appreciable diminution of power* and resultant diminution of torque of the engine on the sustaining rotor shafts 12, elective or otherwise), in which event the rotationally interconnected side-by-side rotors will (through the shafts 12 and bevel gears 16 and 17) turn the horizontal shafts 18, carried in the horizontal lateral tubular housings 19 (in suitable anti-friction bearings), having their abutting ends splined into the ring-gear rotatable retainer 33, whose tapered roller bearings 34 axes are indicated diagrammatically in FIG. 6 by diagonal lines within the ring-gear central housing box 25.

While it is necessary that the blades 6 of the auxiliary control rotor P remain *substantially* perpendicular to the mounting drive-shaft 2 that is carried (in suitable radial-axial thrust bearings) in the normally somewhat vertical tubular housing 3, in order that the rotor P may adapt itself quickly to any quick oscillations of the rotor in its pivotal bracket 8 for steering the craft and preserving lateral stability, it also is desirable and almost necessary that the blades 6 have some flexibility in their connection with the normally somewhat vertical shaft 2 to compensate for differences of lift on the advancing and retreating orbital sides of the control rotor in rapid translational flight, even though this rotor P may have rather short blades 6 and turn at a high rotational speed in comparison with the larger side-by-side rotor blades and the much longer conventional large single sustaining rotor blades of a helicopter. Such a control rotor of light construction with two reversible pitch blades 6 is shown in FIG. 4, indicating a fragmentary vertical cross section at the center of vertical shaft 2 and tubular housing 3, and in FIG. 5, showing a fragmentary rear view of the same parts shown in FIG. 4 at right angles thereto. The shaft 2 rotates in opposed tapered roller anti-friction bearings, the lower one of which is designated 35 in FIG. 4 and is mounted in an expanded tubular tip 36 of the housing 3. The lower tip 37 of the round shaft 2 is polygon in cross section with a suitable shoulder, and a pin 38 holes on this tip section a hub member 39, which is generally cylindrical with the exterior of the upper portion thereof forming a truncated cone. A rectangular gap 40 has been cut in the lower part of hub member 39 to form a yoke for mounting on a transverse pivot 41 a central oscillatable hub section 42, on whose diametrically opposing cylindrical projections 42′ are mounted pivotally the blades 6 with their longitudinal axes in alignment with the longitudinal axes of said projections. Bolts 43 attach to the central hub section 42 of the rotor a retainer 44 whose tips slideably embrace shoulders 45 at the root ends 46 of the two rotor blades 6. In FIGS. 4 and 5 the rotor blades 6, with advancing and retreating edges symmetrical in the position shown, would have no thrust longitudinally of the shaft 2; but stud bolts 47, screwed into the inner faces of the root ends 46 of blades 6, extend through suitable slotted eyelets 48 of linking rods 49, by means of which the angles of attack and thus thrust of the blades 6 are made reversible in a manner to be described.

While FIGS. 4 and 5 illustrate a pivotally mounted control rotor P that has *two blades* with cantilever mounting on a *single pivot* 41, it will be appreciated that it might be desirable to have two similarly pivotally mounted *three-blade* rotors oscillatable on somewhat horizontal drive-shaft tubular housings (one at each end of the fuselage) on a craft of very large size having many paired sustaining rotors mounted at the sides of a long streamlined fuselage as is indicated by FIG. 2. But such a *three-blade* control rotor, in order to accommodate itself to the sudden changes incident to oscillation in its pivotal mounting bracket 8 for steering the craft would need to oscillate universally also on *multiple transverse axes* perpendicular to its mounting shaft 2, in order to compensate for differences of lift on the advancing and retreating sides of the rotor orbit during rapid translational flight. At the same time a simple universal joint connection of such a three-blade (or even more) somewhat rigid rotor on shaft 2 by means of crossed transverse pivots would not be adequate, since such a rotor, turning rapidly without other means of control of the blades 6 with respect to the shaft on which mounted, would not maintain its blades perpendicular to shaft 2 during quick oscillations of the pivotal mounting for steering the craft.

In FIGS. 3 and 7 the axis of pivotally oscillatable tubular housing 7 in its bracket 8 slopes upward slightly toward the gearbox 4 at its rear end, so that shaft 2 in housing 3 depending from the gear-box 4 at right angles thereto points forward slightly from the vertical posture; and thus the rotor P having two blades 6 diametrically opposed (rotating in a plane perpendicular to shaft 2) tends to push the craft forward slightly in addition to tilting the main sustaining rotors S and S′ forward to derive the principal forward vector force in ordinary horizontal flight, in which the short fuselage 1, having substantially hemispherical ends, has little increased drag in high speed forward flight as a result of being tilted downward slightly toward its front tip. Greater air drag would derive from forward tilting to the same extent of the long fuselage 51 with tandem paired rotors indicated in FIGS. 2 and 8, in which the blades 6 of a steering and longitudinal fuselage tilt control rotor P rotate in a plane approximately parallel to the longitudinal axis of the substantially cylindrical fuselage 51; and thus the normal median plane of rotation of the blades 6 in FIG. 8 would be approximately horizontal, when the longitudinal axis of fuselage 51 is horizontal and main side-by-side sustaining rotors are tilted forward to produce the forward vector force for rapid translational flight. For lack of space, no auxiliary steering and fuselage tilt control rotor corresponding to rear rotor P could be shown at the forward (left-hand) ends of FIGS. 2 and 8; but, whether such a forward rotor would have a two-blade rotor similar to that shown at the rear of the fuselage in FIGS. 2, 8, 1 and 3 or alternatively might have a three-blade rotor having its blade roots pivoting in cantilever mountings on a resiliently flexible hub similar to those of the larger side-by-side rotors S and S′ and S.1 and S.1′, the tubular housing 7 in a tubular bracket 8, around whose axis such a forward steering and fuselage-tilt control rotor would be oscillatable and should be substantially horizontal, when the long cylindrical fuselage 51 is in the position shown in FIG. 8, so that the said forward steering and fuselage-tilt control rotor would tend to pull the craft forward slightly in normal translational flight. The forward rotor here mentioned alternatively should be projected upward rather than downward, however.

Numerous means of controlling the angles of attack of reversible blades of counter-torque auxiliary control rotors are known to the art; but, because of the *pivotal* mounting of tubular housing 7 in bracket 8, such means of control (in so far as is known to the applicant) are not workable in the present instance. I accordingly have devised a novel means of using constantly controlled hydraulic pressure for variation of the pitch of the blades 6 on their longitudinal axes. This hydraulic means, which has a special significance in connection with the control of equilibrium of the craft, also may be observed in FIG. 4. Incidentally, it will be noted in connection with that figure that the inner race of the tapered roller bearing 35 rests on an annular spacer 53 in a cup 54 resting on the hub member 39 to retain an annular felt washer 55, which is intended as diagrammatic means of maintaining lubricant for the bearing 35 and is in no way a part of the hydraulic mechanism presently to be described.

In FIG. 4 two annular grooves 56 have been cut into the exterior face of the expanded end section of the tubular housing 3, within which is mounted the bearing 35; and in these annular grooves 56 are installed hydraulic seals 57 here shown as round rubber rings within the surrounding cylindrical member 58. At the top of the cylindrical member 58 are similar seals 57 in grooves 56 in the exterior face of an annular member 59, which is indicated as screwed into place on the tubular housing 3. Midway of the cylinder 58 is a restricted section 60 thereof which has similar hydraulic seals 57 between it and the tubular housing 3 cylindrical at that section. Thus the cylinder 58 may reciprocate longitudinally of the housing 3 within limits as the result of hydraulic fluid being supplied under pressure alternately into the annular chambers 61 on either side of the restricted section 60 of cylinder 58 through suitable orifices 62 therein connected with conduits 63. Conventional means of controlling the supply of fluid under pressure to the respective chambers 61 may be employed for determining reciprocation of the cylinder 58 at the election of the operator, but a special control valve will be described later herein in conjunction with the mechanism controlling longitudinal tilt of the fuselage relative to the horizon.

On the exterior of the reciprocable but non-rotating cylinder 58 are dual annular flanges 64, 68, one of which 68 is attached by means of threads to cylinder 58 for adjustment to retain, between the two annular flanges 64, 68, thrust bearings having balls 65 above and below a central restriction 66 of an outer cylinder 67, which thus is rotatable around the vertically reciprocable but non-rotating cylinder 58. To the rotatable cylinder 67 are attached rods 68 which control the pitch of the blades 6. The rods 68 might have been attached by stud bolts 47 to the blades 6 at suitable inner extensions or brackets of the blades 6 appended on surfaces 46 that would have placed the rods 68 directly in line with the axis of the pivot 41 on each side of the axis of shaft 2, thus permitting the blades 6 to oscillate on said pivot 41 without any change in the angles of attack of the blades 6 as a result of cyclical oscillations due to differences in lift on advancing and retreating sides of the rotor orbit during rapid translational flight. But in FIG. 5 it will be noted that the rods 68 are offset slightly from the head of the pin 41. Presuming that the rotor P is turning counter clockwise looking downward as in FIG. 1, it can be seen from FIG. 5 that there thus will be a tendency for the blades to have a slightly smaller angle of attack as a blade tip rises above a plane perpendicular to the shaft 2 and its housing 3, as a blade would tend to do on the right hand side when advancing in translational flight parallel to the horizon in a mounting such as is shown in FIGS. 1 and 5. Thus the same arrangement for adjusting simultaneously the angles of attack of two blades both cyclically and in unison to compensate for pivotal oscillation of the rotor blades on pivot 41 longitudinally relative to the drive shaft 2, on which it is mounted on a pivot perpendicular to the shaft axis, would be adaptable to a three-blade (or more) cantilever rotor universally attached to the lower tip of shaft 2 for oscillation on multiple axes transverse of the shaft axis. And of course blades on the descending side of such a rotor orbit would receive a reciprocal positive increase in angle of attack of the blades 6 regardless of the number of cantilever mounted blades in the hub. And, when the bearing races of balls 65 above and below annular restriction 66 of rotating cylinder 67 are properly adjusted relative to each other, there is no slack between the pivot stud bolts 47 (screwed into the root ends 46 of rotor blades 6 at equal suitable distances from the axis of blade pivots 42') and the reciprocable cylinder 58, to which said blade roots are attached by upright push rods 49 rigidly attached to cylinder 58 and pivotally mounted on stud bolts 47.

It is contemplated that the *paired* three-blade sustaining rotors S and S' shown in FIG. 1 will have their blades 50 mounted in a manner to give the right degree of cantilever stiffness (relative to their mounting shafts 12) in the special resiliently flexible hubs that make the rotors self-controlling as to automatically instantaneous autorotation upon *even relatively* small diminution of rotor shaft torque, thus permitting them to be mounted at considerable distance from the fuselage without difficulty, and that also make the rotors self-adapting to cross currents of air, which may be due to translational flight at relatively high speeds, to sudden tilt changes of the sustaining rotors S and S' incident to use of the auxiliary control rotor P for moving forward horizontally or for reversing the tilt thereof (either at the election of the operator or as a result of power failure that necessitates autorotation of the blades 50), and to quick change of direction of movement of the craft as a result of tilting the direction of thrust of control rotor P, when traveling at high translational speed. While the resilient hubs of side-by-side rotors S and S' have sufficient flexibility to permit equalization of lift on the advancing and retreating sides of the rotor orbits in rapid translational flight and thus are not subject to vibrational and other stresses of rotors rigidly attached to their shafts, these resiliently flexible hubs have sufficient stiffness also to stabilize the blades at low rotational speeds and to impart the lateral stabilizing action of the rapidly rotating (in comparison with a single larger sustaining rotor) rotor blades (having substantially cantilever attachments to the outer annular element of the rotor hub) to the respective shafts 12 on which they are mounted. Thus, in contrast to much larger rotors having blades whose tips flap vertically and individually in response to aerodynamic and centrifugal forces, my rapidly turning rotors S and S' serve to a very considerable degree as gyroscopes mounted on their shafts 12 in upright tubular housing frames 13 to impart lateral stability to the aircraft through the outrigger frameworks by which rotors S and S' are attached to fuselage 1, even though these rotor hubs are resiliently flexible universally to a sufficient extent.

Figure 6:
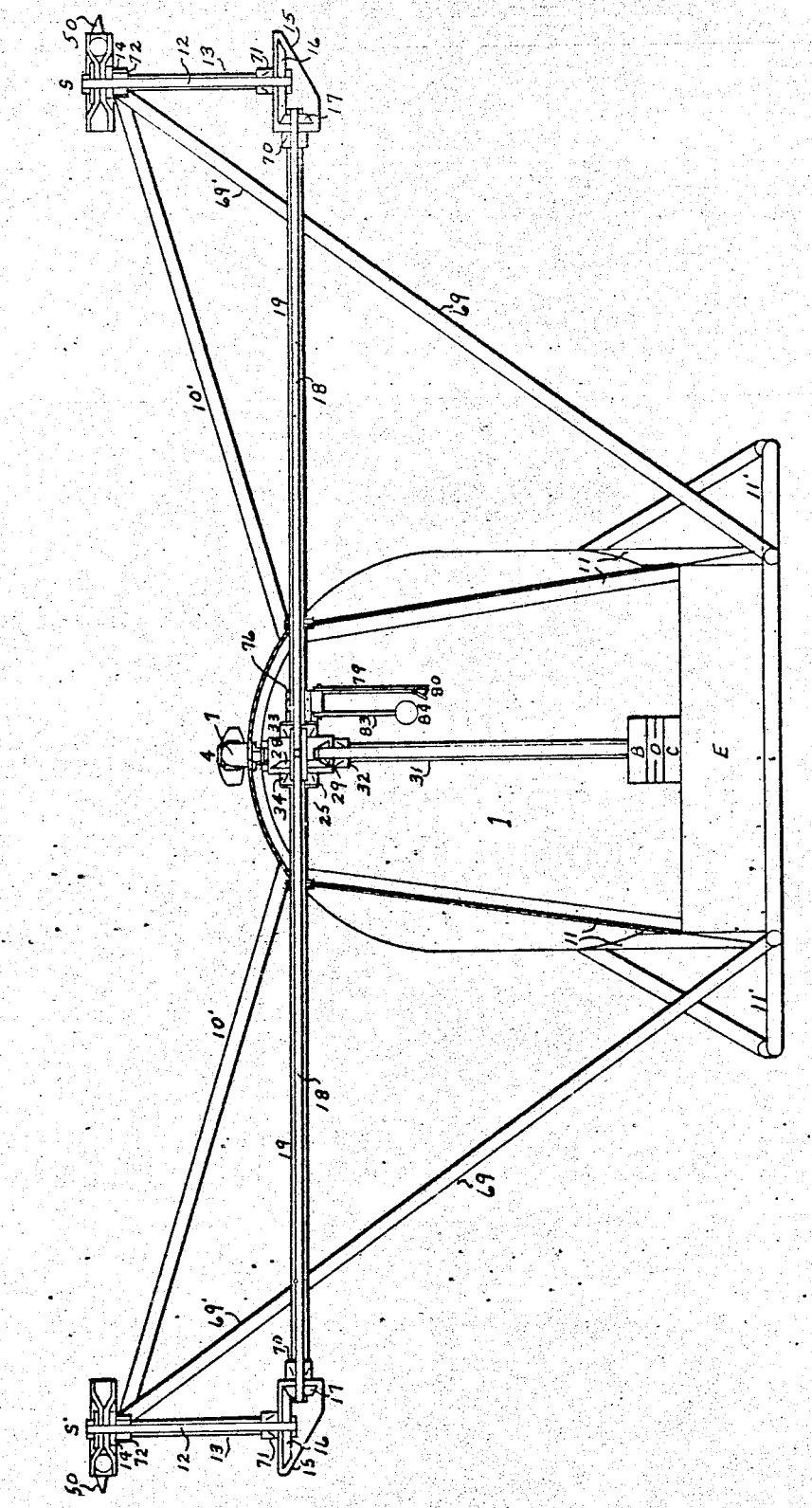
FIG. 6 is a vertical cross section looking rearward through the craft shown in FIG. 1 at the plane passing through the shaft axes of the two main sustaining rotors.
Figure 16:
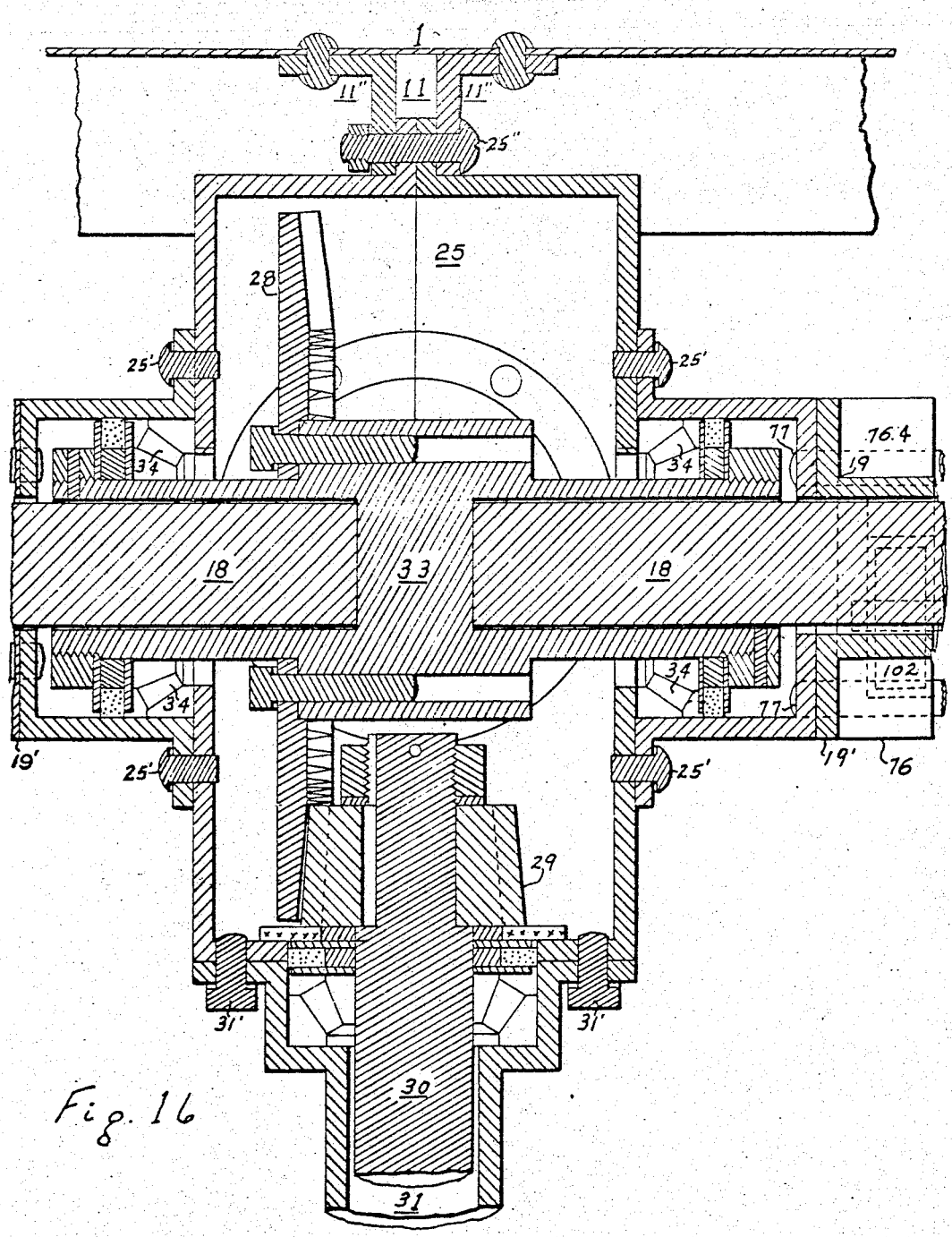
FIG. 16 is a detail vertical cross section at right angles to FIG. 15 through the axes of horizontal and vertical shafts showing attachment of the ring-gear housing box to the hydraulic pump gear enclosing member and to a rigidly attached framework at the crest of the fuselage, as indicated in FIG. 15.

A suitable light but rather rigid outrigger mounting framework for such self-controlling paired sustaining rotors S and S', whose blades 50 have their angles of attack determined individually and instantaneously automatically according to simultaneous variations in the degree of torque on the shafts 12 on which the respective rotors S and S' are flexibly and resiliently mounted, at a suitable distance from the fuselage is indicated in FIG. 6, looking rearward from a plane passing through the axial centers of the vertical shafts 12, tubular housings 13, horizontal drive-shafts 18, and transverse horizontal tubular housings 19. The latter housings 19 constitute a principal element of the mounting frame for the paired rotors. The tubular housings 19 are rigidly attached to the sides of the ring-gear housing box 25 and may be braced otherwise (as indicated by right-angle cross section frames 11.1 and 11" in FIGS. 15 and 16) to keep them diametrically in line *inside* the fuselage housing 1. Note that diagonal trusses 69, which may be tubular, particularly below the horizontal housings 19 for rigidity under compression from weight of rotors S and S' on landing, serve the double purpose *outside* the fuselage 1 of keeping the tubular shaft housings 19 at a proper angle relative to the fuselage (and thus perpendicular to the drive-shaft in tubular housing 31) and (above the horizontal tubular housings 19) of keeping the tubular housings 13 perpendicular to housings 19, thereby tending in one plane to keep the shafts 12 parallel and reinforcing the connections of the tubular housings 13 and 19 with the gear boxes 15. The exterior tips 70 of housings 19 are expanded for retaining bearings in which the shafts 18 rotate and are rigidly attached to the gear-boxes 15, which in turn are rigidly attached to the expanded lower tips 71 of the vertical tubular housings 13, in which other suitable bearings also are carried for the sustaining rotor vertical shafts 12. With the foregoing frame and diagonal brace means, all that is necessary to complete my means of keeping the shafts 12 essentially parallel is to be found in the four diagonally disposed braces 10 and 10', which may be seen in FIGS. 1 and 6 as extending from vertically disposed tubular brackets 72 (mounting the expanded crests of tubular housings 13) to the fore and aft portions of fuselage 1, adjacent its respective hemispherical tips, within which the symmetrically disposed braces 10 and 10' are attached by suitable connections (such as U-bolts) to the inverted "U" tubular frame structures 11, one of which was mentioned in connection with FIGS. 2 and 7. The rear braces 10' of the mounting frames of rotors S and S' are indicated as tubular; but all of these braces may be streamlined in cross section to minimize air resistance from downdraft of the paired rotors as well as from forward horizontal movement of the craft, and forward braces 10 are designed as airfoils to impart some stabilizing lift to the front tip of fuselage 1 especially during autorotation of the rotors in case of power failure or appreciable diminution. In FIG. 1 the forward braces 10 of the paired rotor frames (only partly visible beneath two rotor blades 50) have some width, for the purpose of giving lift of the front tip of the fuselage in case of power failure, particularly near the fuselage, where the chord of the airfoils from leading to trailing edges conform less to downdraft of the rotors and more to forward movement of the craft horizontally.

Not shown in FIGS. 1, 2, 3, and 6 are suitable connections between diagonally disposed bracing members 10 and 10' outside the fuselage 1 and inverted tubular U-shaped frames 11, whose vertical sections are joined to the inward tips of diagonal braces 10 and 10' by conventional connections such as U-bolts 23 in FIGS. 18 and 21 joining the horizontal section of U-shaped frame 11 to a somewhat horizontal plate 23 beneath it. U-bolts joining tubular frames 11 to the inward tips of diagonally disposed frames 10 and 10', however, are somewhat horizontally disposed around tubular frames 11 and have their tips inserted through holes in the side walls of fuselages 1 and 51, whose bolt holes adjacent frames 11 correspond to holes in the flat tips of diagonal braces 10 and 10', whose outer and upper tips are somewhat rigidly attached in turn to tubular brackets 72 (FIG. 6) mounting upright rotor shaft housings 13. In FIGS. 1 and 2 diagonal bracing members 10 and 10' are shown as attached to tubular brackets 72 at angles of sixty degrees from each other and thus, being symmetrically disposed relative to the longitudinal axis of the fuselage and to the horizon, are at angles of about thirty degrees from horizontal lateral tubular housing frames 19 below them. Diagonally disposed bracing frames 10 and 10' are attached to fuselage 1 and its inclosed tubular frames 11 only slightly above a horizontal plane passing through the axis of shafts 18 in horizontal lateral tubular housings 19, as shown in FIG. 6, in which it is indicated that rear frames 10' and their symmetrically disposed forward counterparts 10 would rise from such a horizontal plane at angles of about fifteen degrees. Diagonal truss frame members 69 and 69', attached to lateral tubular housings 19 (below and above it respectively) intermediate its tips and to each other in substantial alignment of their longitudinal axes in a plane perpendicular to the vertical longitudinal plane of fuselages 1 and 51 between points of attachment of the upper tips of truss frame segments 69' to tubular brackets 72 in which rotor shaft housings 13 are mounted rigidly adjacent to their upper tips, are attached at the lower tips of truss frame segments 69 to the approximate midpoints of longitudinal landing frames 11' below the sidewalls of fuselage 1 (FIGS. 3 and 6). Diagonal truss members 69 are the primary means whereby rotors S and S' lift landing frames 11' and thereby fuselage 1; and, since truss members 69 are attached to landing frames 11' at points separated from each other as much as the fuselage is wide but somewhat below that fuselage mounted on said parallel landing frames, trusses 69, 69' are disposed at angles of almost sixty degrees from the horizontal plane passing through the axes of shafts 18 and their telescoping lateral housings 19, so that truss members 69, 69' very effectively serve to keep the upright tubular rotor shaft housings 13 parallel to each other by virtue of the fact that short tubular brackets 72 mounting housings 13 adjacent their upper tips are substantially fixed relative to fuselage 1 and its attached landing frames 11' by frames 10, 10', and 69, 69', while the lower expanded tips 71 of upright rotor shaft housings 13 are rigidly attached to gear boxes 15 held firmly in position relative to fuselage 1 by rigid attachment to expanded outer tips 70 of horizontal lateral tubular housings 19 held rigidly in position by attachment between adjacent tips of truss segments 69 and 69' at a suitable distance between fuselage 1 and gear boxes 15 relative to the length of upright housings 13 for maintain maximum rigidity of the outrigger frameworks to withstand vibration of the widely spaced rotors S and S' with a minimum of weight being required for those outrigger frameworks mounting shafts 12 in suitable anti-friction bearings.

In FIG. 1 the two forward diagonal braces 10, constituting small lifting airfoils particularly adjacent the fuselage, are swept backward at about thirty degree angles from their points of attachment on the fuselage 1 adjacent the rounded somewhat hemispherical front tip of fuselage 1 to the short tubular brackets 72, in which are mounted the expanded upper tips 72 containing bearings 14 in which rotate shafts 12 on which rotors S and S' are mounted. And in FIG. 6 it can be seen that the rear diagonal bracing members 10' of the rotor outrigger frameworks, which are attached to fuselage 1 at points making them disposed substantially symmetrical with forward braces 10 except that they are rearward of brackets 72 instead of forward, have about a fifteen degree dihedral angle, so it may be assumed that airfoils 10 have a suitable dihedral angle with respect to fuselage 1 for imparting stability to that fuselage in case of power failure or appreciable diminution of power while traveling forward at even moderate translational speed, thus tending to lift the nose of the craft and cause the rotors S and S' to become further stabilizing instruments to reduce speed of the aircraft, until such time as the pilot may use other means at his disposal (such as lever 79 adjusting hydraulic valve 75 of control mechanism 76) to control the craft in descending to the ground, all the while being able to steer the craft by lever 21 oscillating the rotor P and its blades 6 relative to bracket 8.

Obviously, considerable variation might be made in the method of mounting such side-by-side rotors, which are entirely self controlling, in response to the amount of torque on their shafts 12 turning in unison in opposite directions, and in the fuselage to be used with them. In FIG. 1 the intent has been to show a possible construction that will indicate some of the possibilities for a craft using side-by-side sustaining rotors (other than the incidental lift of the multipurpose control rotor P) to carry five or six passengers, four of whom could be seated in pairs at the ends of the fuselage 80 to look forward, as would be the operator and another passenger seated aft and forward of the ring-gear housing centrally located near the roof of the fuselage. The length of the paired rotor blades 50 might have been shortened slightly (without lengthening the horizontal frames 19), thereby increasing the disc-loading thereof and at the same time increasing the lateral stabilizing effect of the dual rotors as a result of gyroscopic action, since the nature of my paired rotors having flexible but stiff universal hubs will make them impart to the fuselage framework the effect of spinning tops at the rotary speeds contemplated for two rotors in affording the desired lift. But the intention of FIG. 1 is to point out that blades 50 of such side-by-side rotors would be turning in opposite directions in rotational connection and their tips would retreat over the fuselage 1 in part, as the craft moves horizontally at high speed for a rotary wing aircraft. Note from the fuselage surfaces 1' that the fuselage 1 may be drawn in at its midsection and slope outward at its bottom in that area for accommodation of paired rotor downdraft, which may be utilized in part for cooling the engine etc.

While a conventional landing frame such as generally is used with helicopters might be used with my craft, I have shown a much larger landing frame (composed primarily of two generally parallel longitudinally disposed tubular members 11' widening apart diagonally toward their tips with multiple cross frame members, connecting the two parallel central sections, hidden for the most part by the fuselage 1 but symbolized by one lateral tube 9) to indicate that such a frame with a craft of this type would not be subject to downdraft in the same manner as a craft with a single sustaining rotor. The landing frame also emphasizes diagrammatically the possibilities that are inherent in the landing frame of such a craft having side-by-side rotors, not only for stability in leaving the craft (having relatively "stiff" rotor blades of short length, pivotally oscillatable to change angle of attack in their cantilever mounting in a hub member, flexibly and resiliently mounted on the shaft by means permitting oscillation of the hub member transverse to the axis of the shaft in flight but becoming more fixed relative to the shaft on landing) parked on the ground in high winds, but also for using the landing frame in conjunction with the reversible thrust tilting of fuselage 1 by the auxiliary control rotor P to accomplish rescue tasks that would be impossible without that pivotally mounted tilt-steering control rotor P having a somewhat horizontal tubular drive-shaft housing 7 pivotally oscillatable, at the election of the pilot, in a bracket 8 protruding rearward from the fuselage 1 on an axis substantially in a vertical plane containing the longitudinal axis of that fuselage, so that the pilot can utilize his pivotal oscillation of the tubular housing 7 to vary the direction of the thrust of rotor P to right or left and simultaneously can utilize change (including reversing) in the angle of attack of blades 6 to alter the tilt of fuselage 1 and its lower attached landing framework 11', 9. In FIG. 1 the tubular bracing members 11.4 (rising to the fuselage 1 at angles comparable to those of tubular braces 8' of FIGS. 3 and 6) may be pivotally mounted at the ends of landing frames 11'; but under any circumstances there is plenty of room beneath the diagonally disposed braces for attachment of conventional rescue stretchers laterally between the landing frames 11', which widen apart from points beneath the fuselage 1 both forward and rearward of the fuselage, and which rise from the ground at slight angles toward their tips. Both stretchers would be only indirectly subject to downdraft from the side-by-side sustaining rotors, particularly if the outrigger frames 19, 10, 10' be widened slightly from their relative dimensions shown in FIG. 1; but the forward stretcher would be partioularly free from downdraft, when (as contemplated for rotors S and S') the rotor shafts 12 and rotor blades 50 are designed to turn and travel rearward adjacent fuselage 1, and could be used to special advantage in connection with the pivotally mounted tilt-control rotor P, which has a normally somewhat vertical lifting thrust (for straight forward travel) that can be shifted at the election of the pilot from side to side of the craft on the axis of tubular housing 7 in bracket 8 lying approximately in a vertical plane containing the longitudinal axis of fuselage 1 (and 51) and approximately perpendicular to a plane passing through and containing the axes of the side-by-side rotor shafts, and which thereby gives the operator much more complete control for lift at the ends of the fuselage and simultaneously for horizontal steering *independent of any torque by the main sustaining contra-rotating side-by-side rotors* than would be found in a craft dependent only on center of gravity of the craft to maintain stability in the manner of a helicopter. (The foregoing is mentioned by way of supplementing the obvious possibility that two stretchers may be placed in the fuselage longitudinally thereof with the pilot and an attendant between them—behind and in front of central drive-shaft vertical housing 31. Two additional stretchers obviously also may be placed above the first two.) And, particularly if the forward outside stretcher be made of net wire or cord attached between a pair of laterally disposed poles of light weight, the operator can "fish" even lifeless floating bodies out of the water even in rough seas in the manner of a fisherman catching minnows with a hoop-net. Moreover, rescued persons, not being subject to direct downdraft on the forward frame 9, 11' beneath the gap between the forward orbits of the side-by-side rotors having blades of shorter length, easily can be brought into the fuselage through the double doors 1" in the nose of the fuselage 1. The large doors 1" extending almost to the crest of the fuselage nose might be made slideable in the conventional style of transparent helicopter doors at the sides of the fuselage, but they have been illustrated in FIG. 1 as hingeable from their outer sides at the front of the fuselage to emphasize that they are not subject directly to downdraft of the paired sustaining rotors and would tend to be held closed by air resistance during forward movement of the craft, but can be propped open quite easily in hovering to effect rescues and even to fire small arms through the opened doors in forward flight. Exterior "stretchers" also may be made inflatable for attachment to the landing frames beneath the fuselage to lend buoyancy and stability to the craft on water to some extent without preventing the pilot from using the leverage of control rotor P over the axis of dual rotors S, S', rotatably mounted in housings 13 attached to the outer tips of lateral horizontal housings 19 and gear-boxes 15, for "fishing" people out of the water, since the *shorter blades* of the duel rotors will permit him to tilt the craft longitudinally to a considerable angle relative to the horizon without danger of the blades 50 touching people in the water, as would be the case with a helicopter having a single large sustaining rotor and being dependent primarily on the center of gravity as a means of determining such an angle relative to the water surface.

Any kind of prime mover may be used in the present invention. It even would be possible to use a gas turbine, whose jet exhaust even could be horizontal. But in FIGURES 1 and 6 the space E would indicate space for a reciprocating piston engine, having radially disposed cylinders in a single bank, whose crankshaft is vertical for connection through a suitable clutch arrangement of conventional design and employing an over-running clutch with the drive-shaft 30 in tubular housing 31 that is perpendicular to the lateral horizontal drive-shafts 18 in housings 19. The clutch arrangement is not a part of the present application; but diagrammatically the letter O would indicate any ratchet arrangement, such as one in which friction is used to provide rotary power in only one direction in the manner usually called an over-running clutch. Another manual clutch C of conventional design, manually operable by the pilot, also has been indicated in connection with the over-running clutch O. A conventional brake B has been indicated, but this brake would operate on that section of the clutch C not directly connected with the drive-shaft 30 in tubular housing 31.

Since it has been possible to show all the bevel gears operating on respectively perpendicular shafts, it is possible to use those available for the differential gears of automobiles, which would give a speed to the paired sustaining rotors of about 1/10 of the revolutions per minute of the shaft of the conventional gasoline engine E; and the auxiliary control rotor drive-shaft 5 would turn roughly three times as fast as the dual sustaining rotors S, S'. As indicated by the diagrammatic diagonal lines in FIG. 6, the tapered roller bearings 34 (shown also in detail FIG. 16), in which the ring-gear retainer 33 turns, provide a suitable rotatable mounting without lateral movement for the abutting axially splined tips of the horizontal drive-shafts 18 (FIGS. 15 and 16) in the internal spline grooves of gear retainer 33. Although the side-by-side rotor outrigger frameworks are built for maximum rigidity with their light weight, the splines in gear retainer 33 of shafts 18 are made to fit loosely enough to obviate vibration due to slapping in the diametrically opposed shafts 18, whose tapered roller bearings in the expanded outer tips at 70 of the horizontal lateral shaft housings 19 provide against end-thrust of shafts 18, which also may have additional intermediate bearings to obviate lashing, particularly if shafts 18 are tubular at their midsections.

In FIG. 6 at the right of the ring-gear box 25 can be seen a suitable location in which is installed by means of controlling a continual supply of hydraulic fluid under substantially constant pressure in flight (whether the engine E is running or not and regardless of its rate of rotational speed) for varying the angles of attack a which blades 6 (of the auxiliary fuselage tilt control and steering rotor P) strike the air. The same pendulum lever 83 (with spehical lower tip 84) and manually controlled lever 79 (having a hand grip release 80) that are shown in FIG. 6 as parts of this hydraulic control mechanism may be seen in larger detail in FIG. 9, which shows those levers 83 and 79 fragmentarily as parts of the hydraulic control mechanism viewed toward the rear (and by broken lines in outline internally) from a vertical cross sectional plane passing through the axis of horizontal shaft 18 in tubular housing 19 just as in FIG. 6, although shaft 18, whose mid-section may be tubular (just as shaft 5 in FIGS. 17, 18, 19, 20), has no cross-hatching in very small scale FIG. 6. A vertical cross section of the same hydraulic control mechanism 76 (having a central body section 76.1 with side-closure plates 76.2 and 76.3) at right angles to FIG. 9 through the center of the hydraulic fluid outlet nipple 91 is shown in FIG. 10, where two of several stud bolts 105 clamp the hydraulic mechanism 76 together with its attached drive-gear housing 76.4 to the tubular housing 19, within which is the round horizontal drive-shaft 18. While shaft 18 is round at the plane shown in FIG. 10, it will be noted that at the left side of FIG. 9 there are axially splined teeth (indicated by broken lines) in the shaft 18 that drive an intermediate cog wheel 102 (in a gear case 76.4 bolted, above pendulum shaft 83, to side-plate 76.4 of control mechanism 76 by bolts 77 as indicated in detail FIG. 12 at right angles to FIG. 9), which in turn rotates gear 101 keyed on a tip of small shaft 98" whereby gears 102 and 101

(having intermeshing teeth with each other and with the spline teeth of shaft 18 continually rotating in flight at somewhat the same speed) rotate the adjacent one of two meshing hydraulic pump gears 98 and 98' in a space of conventional design having two peripherally merging cylindrical cavities 99, in which the fluid displacing intermeshing pump gears 98 and 98' fit snugly and rotate on their respective tips as bearing in sidewall plates 76.2 and 76.3, held in fluid-tight contact with central body section 76.1 by stud bolts 77 piercing suitable intermediate gaskets to prevent leakage of the hydraulic fluid.

What is claimed is:

1. In an aircraft, a hydraulic means of varying the angle of attack of blades of a rotor comprising: a shaft, on which the rotor is mounted, rotating in suitable bearings in a non-rotating cylindrical housing attached to the frame of the craft; round enlargements, one of which encases one of the bearings, spaced apart on the shaft housing; a non-rotating cylinder having a slidable fit over the round enlargements and having a restriction in its mid-section between the two enlargements whose round inner dimension fits the cylindrical shaft housing in a similar manner with suitable flexible hydraulic seals being provided between the housing and the restriction as well as between the enlargements and their enveloping non-rotating cylinder, so that hydraulic pressure fluid cannot escape from the ends of said cylinder and does not pass in appreciable quantity from one side of the restriction to the other in said cylinder, there being conduits, of flexible material such as rubber-fabric hose, leading from a control valve connected with a hydraulic pressure pump, that are connected to suitable nipples which enter the non-rotating cylinder at its mid-section and lead to the two fluid chambers inside said cylinder on each side of the restriction, whereby fluid under pressure is supplied alternately to each of the two chambers thereby causing the non-rotating cylinder to move reciprocally relative to the housing and its inclosed rotor shaft in response to direction of the control valve; a cylinder provided with a pair of two-way thrust bearings rotatably mounted on the non-rotating reciprocating cylinder near its end adjacent the bladed rotor; and stiff push-pull linkages rigidly attached to the rotatable cylinder, in equally spaced relationship to each other around the cylinder, between that cylinder and corresponding rotor blades to which each linkage is pivotally attached adjacent the leading edges of the blades at points spaced equally from longitudinal axes on which the blades pivot to change their angles of attack, said means not employing hydraulic fluid conveyed through the rotor shaft.

2. In rotary wing aircraft, a hydraulic means of varying the angle of attack of rotor blades consisting of means of reciprocating a fluid retaining cylinder, having two compartments provided with suitable annular flexible seals preventing passage of fluid, longitudinally of a smaller parallel telescoped cylindrical housing through which extends a rotor shaft rotating in tapered roller bearings mounted in said shaft housing, a second cylinder having suitable thrust bearings mounted on said reciprocable cylinder relative to which the second cylinder rotates, and linkages, rigidly attached to the second cylinder, between the rotatable cylinder and the rotor blades, to which each linkage is attached pivotally at points spaced from longitudinal axes on which the blades pivot, said means not employing hydraulic fluid conveyed through the rotor shaft.

3. A rotary wing aircraft comprising a fuselage framework, outrigger frames at each side of the fuselage framework on which are mounted paired rotors on upright shafts, means of rotating the upright paired rotor shafts using a common shaft driven by a prime-mover, said paired rotors becoming autorotational immediately and automatically on diminution of power from the prime-mover, and means of controlling longitudinal tilt of the fuselage frame relative to the horizon on an axis parallel to lines projected from the center of the hub of each rotor perpendicular to a vertical plane passing through the longitudinal axis of the fuselage frame, said means of tilt control consisting of an auxiliary rotor, mounted near an end of the fuselage frame, whose normal thrust is in the said vertical plane passing through the longitudinal axis of the fuselage frame, and whose blades are provided with hydraulic means of adjusting and preferably reversing their angle of attack consisting of means of reciprocating a fluid retaining cylinder, having two compartments provided with suitable annular flexible seals preventing passage of fluid, longitudinally of a smaller parallel telescoped cylindrical housing through which extends a rotor shaft rotating in tapered roller bearings mounted in said shaft housing, a second cylinder having suitable thrust bearings mounted on said reciprocable cylinder relative to which the second cylinder rotates, and linkages, rigidly attached to the second cylinder, between the rotatable cylinder and the rotor blades, to which each linkage is attached pivotally at points spaced from longitudinal axes on which the blades pivot, said means not employing hydrauic fluid conveyed through the rotor shaft.

References Cited by the Examiner

UNITED STATES PATENTS

| | | | |
|---|---|---|---|
| D. 144,401 | 4/1946 | Lewis | 170—135.2 X |
| 1,351,821 | 9/1920 | Wilkinson | 244—17.23 X |
| 1,838,327 | 12/1931 | Salisbury | 244—17.191 |
| 1,849,766 | 3/1932 | McGuire | 170—135.2 |
| 1,957,813 | 5/1934 | Wilford | 170—135.2 |
| 1,970,114 | 8/1934 | Weigand | 170—160.51 |
| 2,023,105 | 12/1935 | Smith | 244—17.13 |
| 2,080,522 | 5/1937 | Wilford | 170—160.25 |
| 2,098,100 | 11/1937 | Kaiser | 170—160.16 |
| 2,256,918 | 9/1941 | Young | 170—160.26 X |
| 2,339,836 | 1/1944 | Campbell | 170—135.2 |
| 2,366,995 | 1/1945 | Aulin | 244—80 |
| 2,369,652 | 2/1945 | Avery | 244—17.19 |
| 2,377,386 | 6/1945 | Stalker | 170—160.32 X |
| 2,420,784 | 5/1947 | Larsen | 244—17.19 |
| 2,437,330 | 3/1948 | Mullgardt | 170—160.27 X |
| 2,479,549 | 8/1949 | Ayres et al. | 244—17.13 |
| 2,487,020 | 11/1949 | Gilcrease | 244—17.21 X |
| 2,491,549 | 12/1949 | Brewster | 170—135.22 |
| 2,531,976 | 11/1950 | Garrett | 244—17.19 XR |
| 2,554,311 | 5/1951 | Place | 170—160.52 |
| 2,569,061 | 9/1951 | Hunt | 170—160.25 |
| 2,604,949 | 7/1952 | McDonald | 170—135.24 X |
| 2,643,726 | 6/1953 | Muther | 170—160.43 X |
| 2,670,804 | 3/1954 | Campbell | 170—135.24 |
| 2,672,939 | 3/1954 | Campbell | 170—135.24 |
| 2,722,985 | 11/1955 | Biermann | 170—160.21 |
| 2,724,446 | 11/1955 | Hill | 170—160.26 |
| 2,755,871 | 7/1956 | Gerstenberger | 244—17.11 X |
| 2,795,284 | 6/1957 | Sikorsky | 170—160.16 |
| 2,818,124 | 12/1957 | Johnston | 170—160.55 |

OTHER REFERENCES

American Helicopter, February 1949, p. 11.
American Helicopter, October 1951, p. 6.
Aviation Week Magazine, p. 17, Sept. 14, 1953.

MARK NEWMAN, *Primary Examiner.*

CHARLES F. GAREAU, M. L. MARLAND, ABRAM BLUM, JULIUS E. WEST, *Examiners.*

H. H. CARD, J. E. ROCHE, A. W. HILBURGER, W. E. BURNS, *Assistant Examiners.*